United States Patent [19]

Ash et al.

[11] Patent Number: 5,101,451
[45] Date of Patent: Mar. 31, 1992

[54] REAL-TIME NETWORK ROUTING

[75] Inventors: Gerald R. Ash, West Long Branch; Jin-Shi Chen, Holmdel, both of N.J.; Alan E. Frey, Naperville; Andrew W. Peck, Lisle, both of Ill.

[73] Assignee: AT&T Bell Laboratories, Murray Hill, N.J.

[21] Appl. No.: 501,334

[22] Filed: Mar. 26, 1990

Related U.S. Application Data

[63] Continuation-in-part of Ser. No. 291,845, Dec. 29, 1988, abandoned.

[51] Int. Cl.$^5$ .................. H04M 3/36; H04M 7/06
[52] U.S. Cl. ..................... 379/221; 379/113; 340/827
[58] Field of Search ............... 379/220, 221, 211, 113, 379/230; 340/827

[56] References Cited

U.S. PATENT DOCUMENTS

| | | | |
|---|---|---|---|
| 3,297,829 | 1/1967 | Germanton | 379/208 |
| 3,591,724 | 7/1971 | Yaku et al. | 379/221 X |
| 4,345,116 | 8/1982 | Ash et al. | 379/221 |
| 4,669,113 | 5/1987 | Ash et al. | 379/221 |
| 4,704,724 | 11/1987 | Krishnan et al. | 379/221 |
| 4,723,272 | 2/1988 | Maat | 379/211 |
| 4,748,658 | 5/1988 | Gopal et al. | 379/2 X |
| 4,756,019 | 7/1988 | Szybicki | 379/112 |

OTHER PUBLICATIONS

B. R. Hurley et al., "A Survey of Dynamic Routing Methods for Circuit-Switched Traffic", *IEEE Communications Magazine*, vol. 25, No. 9, Sep. 1987, pp. 13-21.

*Primary Examiner*—James L. Dwyer
*Attorney, Agent, or Firm*—W. Ulrich

[57] ABSTRACT

An arrangement for routing calls from a source switch to a destination switch in a telecommunications network. If a direct trunk is available between the two switches, that trunk is used. Otherwise, the destination switch is queried to obtain availability data of trunks to that switch from intermediate switches of the network. This availability data is then compared with availability data of trunks from the source switch to the intermediate switches. A route is then selected using an intermediate switch having available trunks from the source switch and to the destination switch. If a route using lightly loaded trunk groups is available, that route is selected in preference to the use of a route using more heavily loaded trunk groups. Advantageously, routing is performed to dynamically optimize selection of a route based on the current state of the network.

70 Claims, 24 Drawing Sheets

| ROUTE STATUS | NSN → | | | | | | | |
|---|---|---|---|---|---|---|---|---|
| | 1 | 2 | 3 | 4 | 5 | 6 | 7 | 8 |
| CHICAGO'S LLITG S | 0 | 1 | 0 | 0 | 0 | 1 | 0 | 0 |
| CHICAGO'S L&HLITG S | 0 | 1 | 0 | 0 | 0 | 1 | 1 | 0 |

| ROUTE OR TRUNK GROUP STATUS | NSN → | | | | | | | |
|---|---|---|---|---|---|---|---|---|
| | 1 | 2 | 3 | 4 | 5 | 6 | 7 | 8 |
| SAN FRANCISCO'S LLITG S | 0 | 0 | 0 | 1 | 1 | 1 | 1 | 0 |
| DALLAS' LLOTG S | 1 | 1 | 0 | 1 | 0 | 1 | 1 | 0 |
| RESULTING LLRISW | 0 | 0 | 0 | 1 | 0 | 1 | 1 | 0 |
| DALLAS' AISW FOR SAN FR. | 0 | 0 | 0 | 1 | 0 | 0 | 1 | 0 |
| RESULTING ALLRISW | 0 | 0 | 0 | 1 | 0 | 0 | 1 | 0 |

| ROUTE OR TRUNK GROUP STATUS | NSN → | | | | | | | |
|---|---|---|---|---|---|---|---|---|
| | 1 | 2 | 3 | 4 | 5 | 6 | 7 | 8 |
| SAN FRANCISCO'S LLITG S | 0 | 0 | 0 | 1 | 0 | 1 | 1 | 0 |
| ATLANTA'S LLOTG S | 1 | 0 | 0 | 0 | 1 | 0 | 0 | 1 |
| RESULTING LLRISW | 0 | 0 | 0 | 0 | 0 | 0 | 0 | 0 |
| SAN FRANCISCO'S H&LLITG S | 0 | 0 | 0 | 1 | 1 | 1 | 1 | 0 |
| ATLANTA'S H&LLOTG S | 1 | 0 | 0 | 0 | 1 | 1 | 0 | 1 |
| ATLANTA'S AISW FOR SAN FR. | 0 | 0 | 0 | 0 | 1 | 1 | 0 | 1 |
| RESULTING AHLRISW | 0 | 0 | 0 | 0 | 1 | 1 | 0 | 0 |

| ROUTE OR TRUNK GROUP STATUS | NSN → | | | | | | | |
|---|---|---|---|---|---|---|---|---|
| | 1 | 2 | 3 | 4 | 5 | 6 | 7 | 8 |
| CHICAGO'S LLITG S | 0 | 1 | 0 | 0 | 0 | 1 | 0 | 0 |
| PHOENIX'S LLOTG S | 0 | 0 | 1 | 0 | 1 | 0 | 0 | 1 |
| RESULTING LLRISW | 0 | 0 | 0 | 0 | 0 | 0 | 0 | 0 |
| CHICAGO'S H&LLITG S | 0 | 1 | 0 | 0 | 0 | 1 | 0 | 0 |
| PHOENIX'S H&LLOTG S | 0 | 0 | 1 | 0 | 1 | 0 | 1 | 1 |
| RESULTING HLRISW | 0 | 0 | 0 | 0 | 0 | 0 | 0 | 0 |
| CHICAGO'S RH&LLOTG S | 0 | 1 | 0 | 0 | 0 | 1 | 0 | 1 |
| PHOENIX'S RH&LLOTG S | 0 | 0 | 1 | 0 | 1 | 0 | 1 | 1 |
| RESULTING RRISW | 0 | 0 | 0 | 0 | 0 | 0 | 0 | 1 |
| PHOENIX'S AISW FOR CHICAGO | 0 | 0 | 0 | 0 | 0 | 0 | 1 | 1 |
| RESULTING ARRISW | 0 | 0 | 0 | 0 | 0 | 0 | 0 | 1 |

| ROUTE OR TRUNK GROUP STATUS | NSN → | | | | | | | |
|---|---|---|---|---|---|---|---|---|
| | 1 | 2 | 3 | 4 | 5 | 6 | 7 | 8 |
| CHICAGO'S LLITG S | 0 | 1 | 0 | 0 | 0 | 1 | 0 | 0 |
| DENVER'S LLOTG S | 0 | 0 | 1 | 0 | 0 | 0 | 0 | 1 |
| RESULTING LLRISW | 0 | 0 | 0 | 0 | 0 | 0 | 0 | 0 |
| CHICAGO'S H&LLITG S | 0 | 1 | 0 | 0 | 0 | 1 | 0 | 0 |
| DENVER'S H&LLOTG | 0 | 0 | 1 | 1 | 0 | 0 | 0 | 1 |
| RESULTING HLRISW | 0 | 0 | 0 | 0 | 0 | 0 | 0 | 0 |

ACTIONS AT ASW:
FIND TRUNK TO ISW

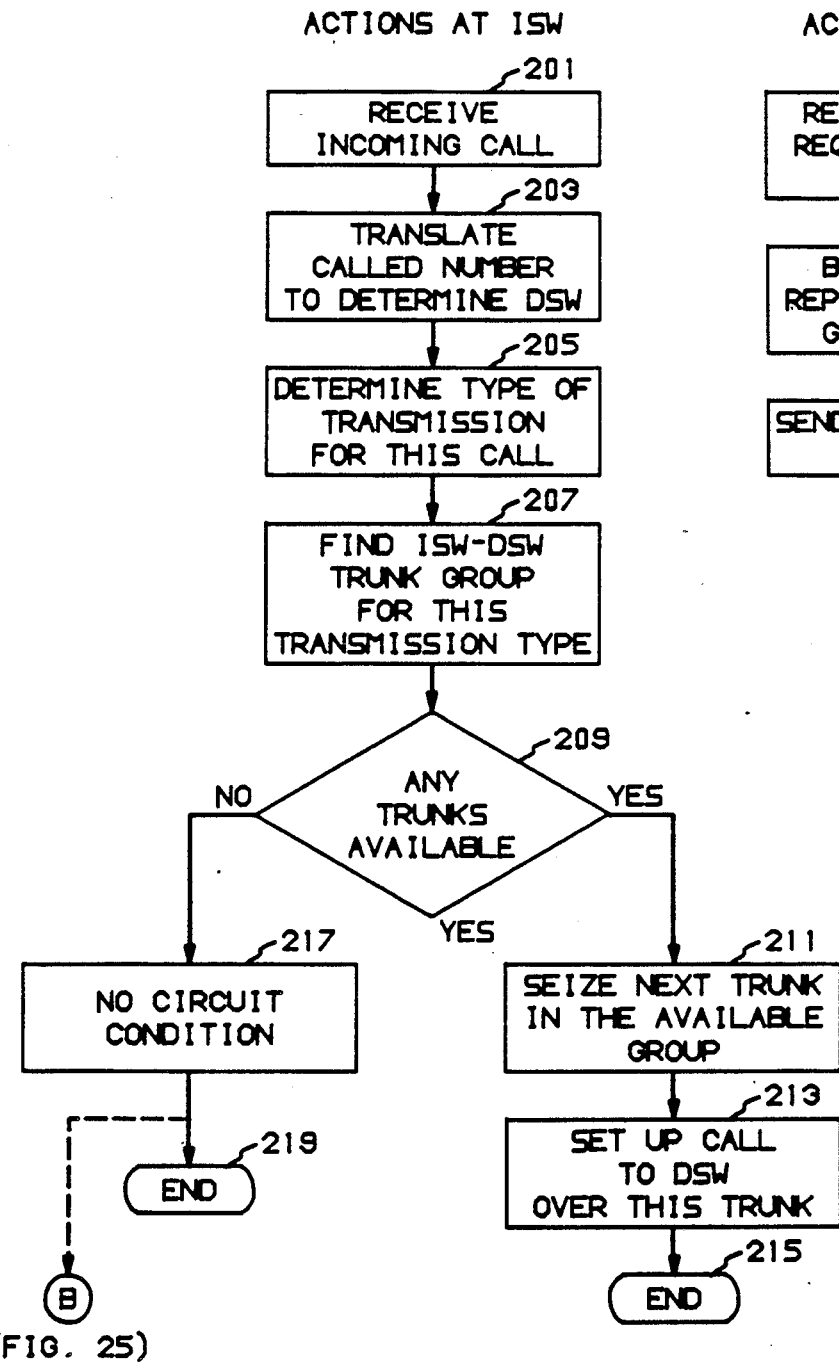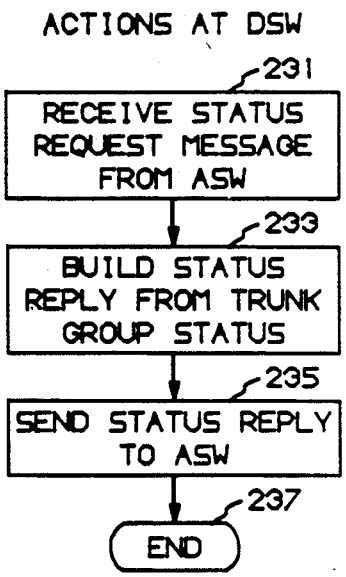

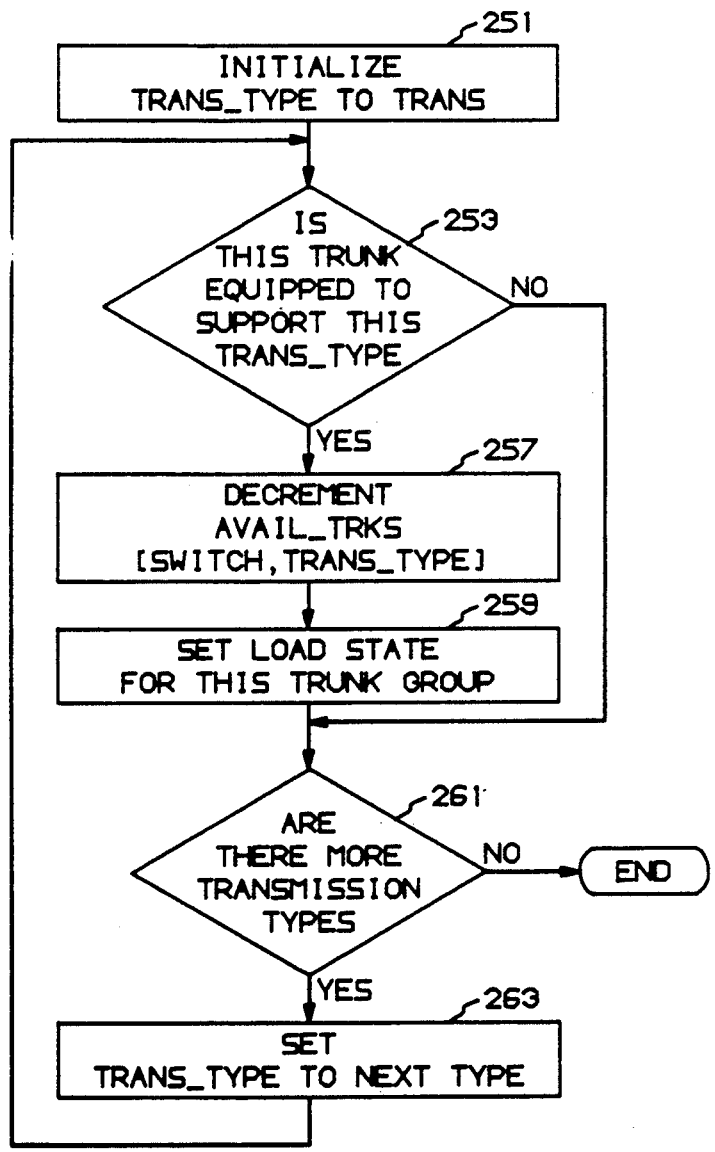

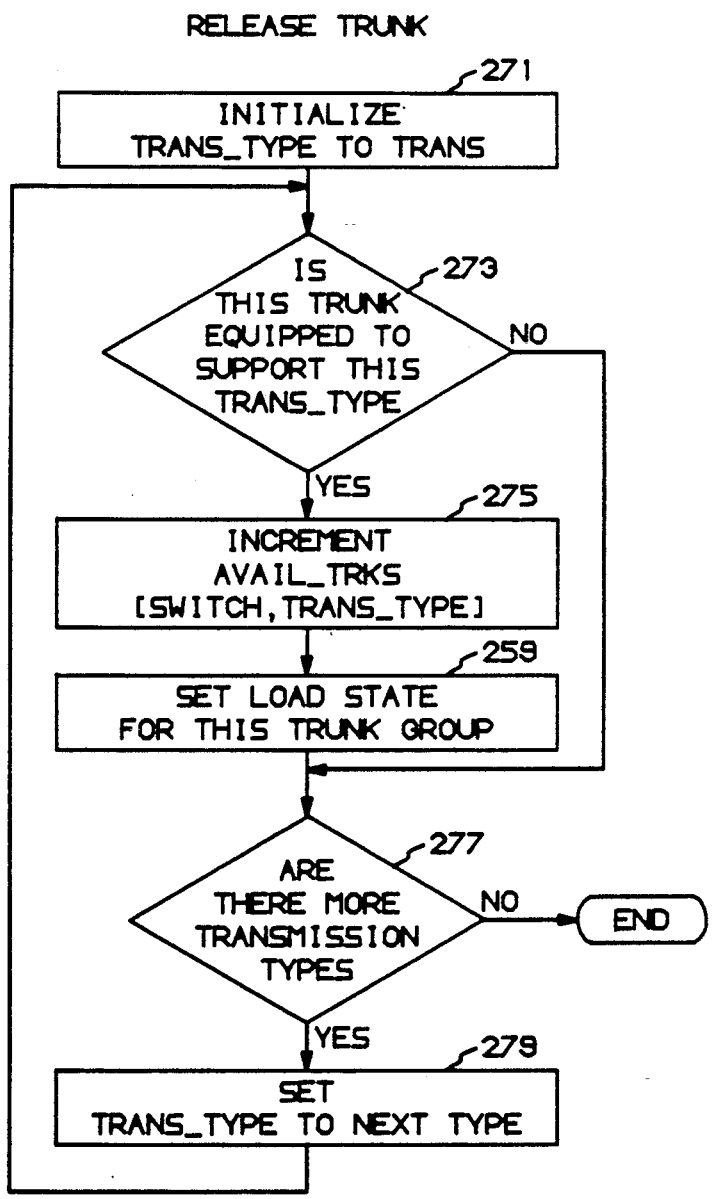

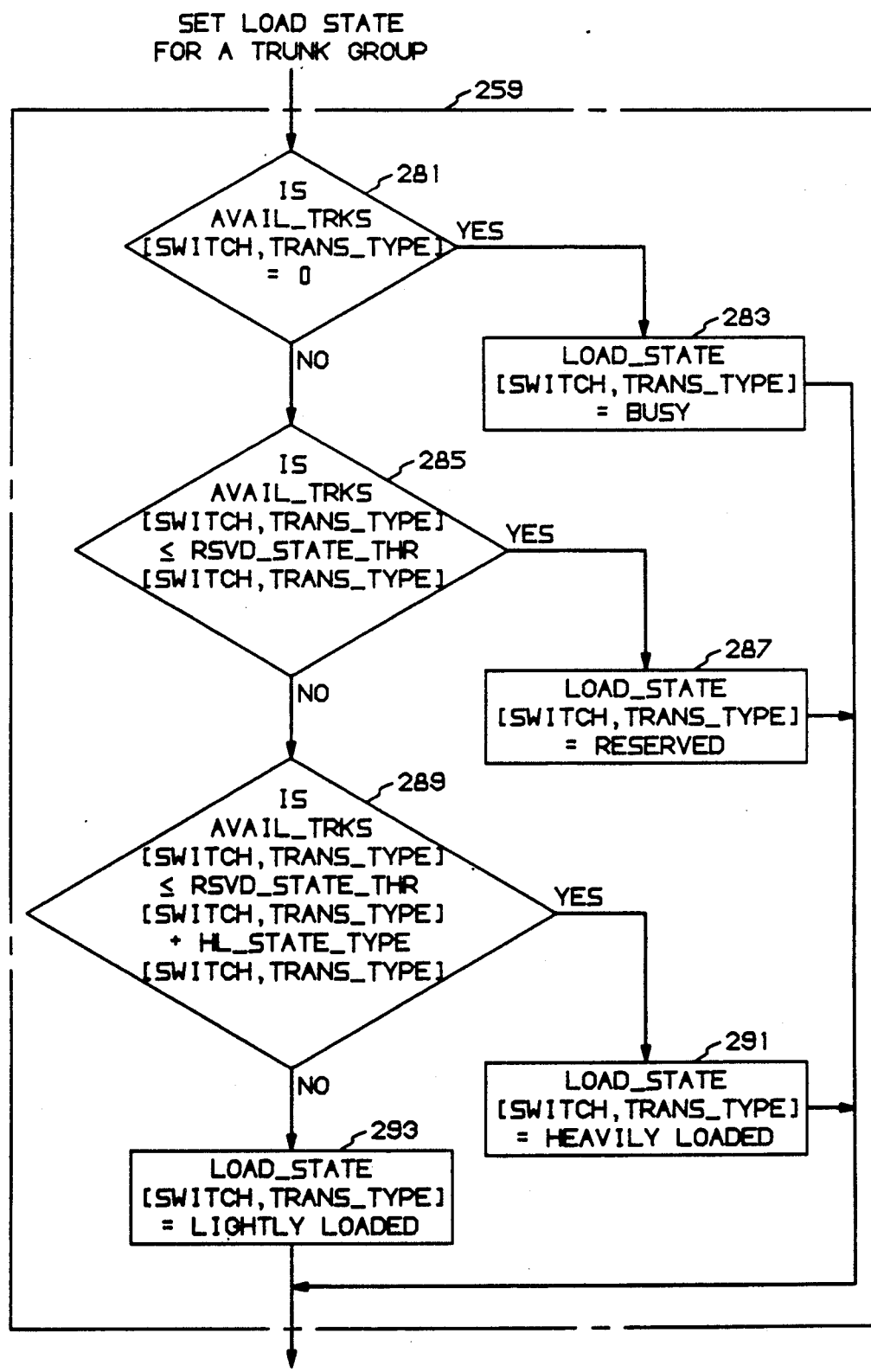

REAL-TIME NETWORK ROUTING

This application is a continuation-in-part of application Ser. No. 291,845, filed on December 29, 1988, now abandoned.

TECHNICAL FIELD

This invention is in the field of telecommunications call routing of calls in complex telecommunications networks.

PROBLEM

Complex telecommunications networks, such as AT&T's public switched toll network, usually require that a substantial portion of the calls across the network be routed between a source switching system and a destination switching system via an intermediate switching system. One arrangement for routing calls in a large network is the dynamic non-hierarchical routing (DNHR) arrangement described in Ash et al.: U.S. Pat. No. 4,345,116. In this arrangement, each switching system is equipped to translate from a received directory number to find a corresponding destination switch. Each switch is further equipped to translate from the identity of the destination switching system to an ordered set of up to 14 direct (i.e., without using an intermediate switching system), or alternate routes for reaching this switching system. Each switching system is further equipped with 16 sets of alternate routing tables in order to allow different routing choices to be used for handling the different characteristics of the call traffic at different hours of the day or days of the week. The routing tables are typically updated approximately once per week from information collected at a central operation support system, an integrated routing administration system. In addition, each switching system transmits circuit occupancy, and out of service data, and call loads to a centralized network management system every five minutes or even more frequently, to allow a centralized network management system to respond to special conditions such as temporary overloads of facilities or equipment outages.

DNHR, while it represented a major advance over earlier hierarchical arrangements, does present a number of problems. First, while the capacity of a given network using DNHR has been substantially increased over the capacity of that same network using earlier hierarchical routing arrangements, the performance of DNHR is still far from optimum. Second, DNHR requires that if an alternate route is attempted and the intermediate switching office has no available trunks to the destination switching system, that intermediate switching system must return a message to the source system, and the source system then tries another route. If many different alternate routes are attempted for each call during heavy load, this message traffic is heavy causing a substantial increase in call processing load to process these messages and appreciable delay in setting up the connections. Third, engineering and administration costs for maintaining a DNHR network in a close to optimum routing arrangement are high, requiring large numbers of traffic measurements in each switching system, substantial data processing in the integrated routing administration system, and careful monitoring of the results by traffic administration. Fourth, to respond to sudden changes, such as the outage of a switching system, the failure of a major transmission facility, or the presence of some natural disaster in one region, it is necessary to have a knowledgeable staff available to quickly change the routing patterns in order to protect the overall performance of the network. Fifth, DNHR requires that each switching system maintain a large number of tables to describe the routing to be used in each of the 16 different load set periods. Sixth, in an integrated network carrying, for example, voice and data, it is very difficult in a DNHR routing pattern to arrange to have an overflow mechanism for flowing traffic from, for example, voice to data facilities without creating excessive risk of sharply increasing the blockage, of, for example, data calls.

An additional problem that is encountered in obtaining optimum use of communication facilities is the following:

When a telecommunications network supports different types of services, it is desirable to ensure that an adequate number of trunks are available for each type of service. For example if the trunks connecting two switching systems are used for carrying both voice and data traffic, it is desirable that a minimum number of the trunks between these two switches be available for carrying voice traffic, and that another minimum number of trunks between these two switches be available for carrying data traffic. It is also desirable that a minimum number of the trunks between these two switches be available for carrying traffic that originates at one of the switches, and that a different minimum number of the trunks between these two switches be available for carrying traffic that originates at the other of the two switches. Also, it is desirable to be able to quickly and efficiently change the number of trunks that should be made available to the different services in response to changes in the forecasted loads for these services. Sometimes these forecasted loads change within minutes, e.g., when a television commercial is aired prompting a large number of customers to call particular number.

Some prior art systems accomplish these goals by providing a first trunk group between these two switches dedicated only to voice traffic, and a second trunk group between these two switches dedicated only to data traffic. In some cases, an overflow group is provided which can carry either voice or data traffic if all the trunks in the voice-only or the data-only traffic group are unavailable for a voice or a data call, respectively. Additionally, trunk groups are sometimes assigned to be one way groups, only able to carry traffic that originates at one of the switches connected by the group. Such arrangements have the limitation that the trunks are not used as efficiently as they might be. For example, if most of the data trunks are available and the voice traffic is experiencing a peak, many available trunks dedicated to data traffic are unavailable for voice traffic. To change the number of trunks available to each of the services in response to a change in the forecasted loads for the these services requires that the assignment of trunks to the different trunk groups be modified. This arrangement is a slow and costly process.

A further general problem of the prior art, therefor, is that when trunk groups for carrying a plurality of different types of traffic are used to interconnect the switching system of the telecommunications network, and when it is desired to maintain a minimum object level of traffic availability for each of these different types of traffic, the present arrangements lead to a less than optimum utilization of the trunk plant interconnecting these switching system; there is not a fast, efficient way to change the minimum objective level of traffic availability for each of these different types of services as traffic patterns change over time.

SOLUTION

The foregoing problems and deficiencies are solved and an advance is made in the art in accordance with the principles of our invention by routing those calls for which there is no available direct communication path or circuit between a source switching system and a destination switching system via an intermediate switching system, advantageously selected by comparing availability data of circuits between the source switching system and each intermediate switching system with availability data for circuits between the destination switching system and each of the intermediate switching system. A route using an intermediate switching system having circuits available to both the source switching system and the destination switching system is selected. Advantageously, such an arrangement provides for a routing capability distributed into each of the switches performing the routing and selects a route with a high degree of assurance that the route is available. Advantageously, such an arrangement immediately responds to outages of switching systems or transmission facilities by routing calls around these systems or facilities.

In accordance with specific embodiment of the invention, availability data for circuits between switching systems is graded so that routes using lightly loaded facilities are preferred in the selection over routes using more heavily loaded facilities. Advantageously, such an arrangement diverts more traffic into lightly loaded facilities, thus decreasing blockage in the more heavily used routes. Advantageously, such preference is given dynamically for each call thus permitting the overall network to respond immediately to shifts or traffic. Advantageously, such an arrangement routes more traffic over lightly loaded trunk groups, thus reducing blockage by keeping that load away from the more heavily loaded trunk groups.

In accordance with one aspect of this embodiment of the invention, availability data from the destination switching system is returned via a common channel signaling network to the source switching system whenever a direct circuit is not available between these two systems. Advantageously, such an arrangement provides up to date availability data to the source switching system for route selection.

In accordance with another aspect of this embodiment of the invention, a selection among available routes within a graded group (e.g., lightly loaded facilities) is made by starting the selection process from a random point within the group of routes, the group being arranged in circular fashion so that the last member precedes the first. In one implementation, the random point is one beyond the intermediate switch laster used for call to the destination switch. Advantageously, such an arrangement avoids bunching of traffic to certain facilities.

In accordance with another aspect of this embodiment of the invention, each switch may reserve a variable number of circuits to each connected switch and return data concerning availability based on availability of only the unreserved circuits. Trunks are reserved as a function of the blockage of calls over the route of the trunks. Advantageously, such an arrangement optimizes the amount of traffic carried by direct circuits and reduces blockage between pairs of switches that are not meeting their blockage objectives.

In accordance with another aspect of this embodiment of the invention, the telecommunications network comprises a voice network and a circuit switched data network. Advantageously, combined voice and data circuits are made available for voice service or data service under the control of each switching system to optimize overall network performance without jeopardizing availability of data service by reserving such circuits for one or the other type service under high blockage conditions. More generally, trunks usable for two or more services can be reserved for one type of service if the blockage for that type of service becomes excessive.

In accordance with a further principle of this invention, trunk groups in a telecommunications network are used as the primary, or first-choice, route for a plurality of different types of telecommunications traffic. A trunk group can be the first choice route for calls destined for the switch directly connected by the trunk group, as well as for calls destined for other switches in the network, which subtend the switch directly connected by the trunk group. Calls to any of these switches can be further separated by the various service types supported by the network, e.g., voice calls, data calls, calls that are free to the caller, etc., so that calls destined to a particular switch for a given service type are classified as a unique traffic parcel. Call completion objectives can be specified for each traffic parcel. An arrangement is provided whereby trunks usable for two more traffic parcels can be reserved for one type of traffic parcel whenever the current completed load for that traffic parcel is below the call objective for that traffic parcel. An idle trunk in the trunk group is usable for a new call attempt for a particular traffic parcel if the current completed load for that traffic parcel is below the call objective for that traffic parcel, or if the present number of available trunks in the group is above a threshold of the number of trunks in the trunk group being reserved for other traffic parcels.

In accordance with one feature of the invention, two or more different thresholds are provided for the number of trunks that must be available before various services are allowed to use an available trunk in a particular trunk group. A lower threshold is provided to maintain traffic capacity for key services that are below their respective objective loads; key services are services for which it is particularly desirable to maintain capacity to meet the call load objectives. A higher threshold is provided to maintain traffic capacity for all services which are below their respective object loads. Advantageously, this type of arrangement provides the flexibility for ensuring that call objectives for the particular types of services which are considered to be key services, are maintained, even in the presence of unusual traffic conditions or partial trunk outages.

In one specific embodiment of the invention, a type of service which is considered to be a key service, is allowed to seize an available trunk in a route whenever the current carried load for that service is less than the objective level for that service. A type of service which is considered to be a standard service, is allowed to seize an available trunk in a route whenever the current carried load for that service is less than the objective level for that service, and if the number of available trunks in the route is greater than a parameter set for that route, called the key reserve threshold. If the current carried load is equal to or greater than the objective load for a service, then an available trunk in a route may be seized only if the number of available trunks in the route is greater than another parameter set for that route, known as the total reserve threshold. The key reserve threshold for a route is the difference between the actual load carried and the load objective for that type of service summed over all key services which use this route as their primary route. The total reserve threshold for a route is the sum of all positive differences between the load objective and the actual carried load for each of the services, including both standard and key services, which use this route as their primary route. In accordance with one aspect of the invention, the number of trunks reserved for a particular service is limited to a reserve limit for that service. In mathematical terms, the reserve parameter for a particular service is the minimum of two numbers, the positive different, if any, between the objective and the carried load for that service, and the reserve limit for the service. If the carried load equals or exceeds the objective load for a service, then the reserve parameter for that type of traffic is 0.

In accordance with another aspect of the invention, when a trunk group is being used for an alternate route, a trunk may be seized only if the number of available trunks in that group exceeds the total reserve threshold for the trunk group.

This type of arrangement offers a number of advantages. Trunk capacity that has been allocated for a particular service, or for incoming traffic from another switched, which is not being used up by the current traffic load, is made available for use by other services which are seeing call attempt loads greater than there forecasted load objectives, so trunks between two switches are used much more efficiently. If trunks are taken out of service or are otherwise made unavailable, then key services are given preference for the remaining capacity in the group until they reach their load objectives. The trunk groups can be administered as single entities and a simple change of one parameter can be used to adjust for changes in traffic patterns in recognition for a need for a different load objective for a particular type or traffic. For trunk groups connecting a customer directly to a switch, these load objectives may be changed dynamically by the customer, if the customer requires a higher load objective for a particular type of traffic, either temporarily or permanently. Trunks may be added or subtracted independently of changing the load objective numbers for each traffic type.

BRIEF DESCRIPTION OF THE DRAWING

FIGS. 11–20 and 22–26 are flow charts of a method for controlling route selection;

DETAILED DESCRIPTION

Figures 1, 2:
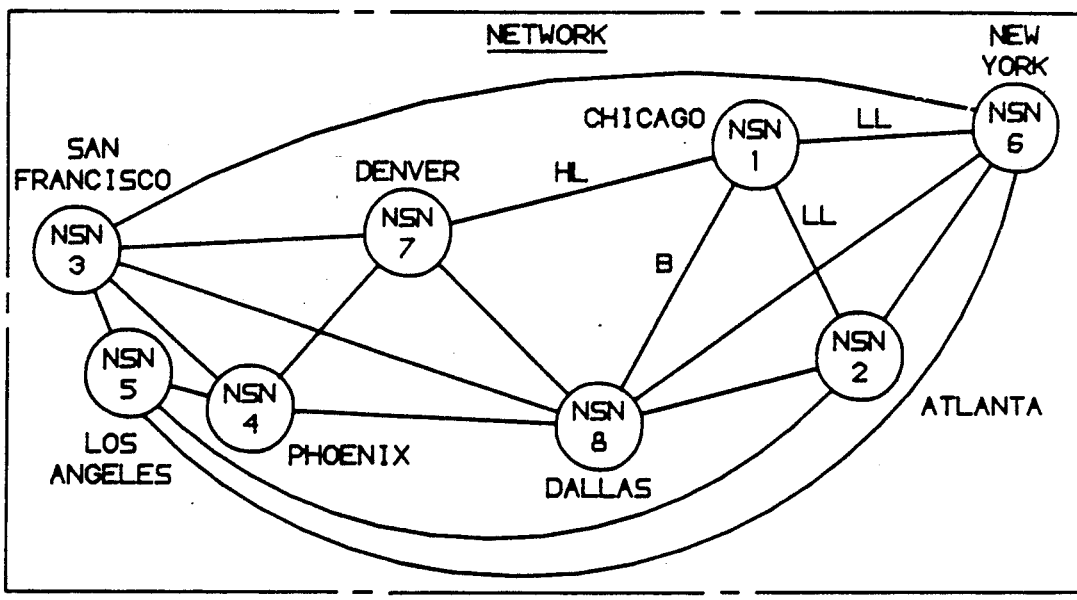
FIGS. 1–10 illustrate the choice of routes in accordance with the invention under different traffic conditions.

1.1 High Level Overview of Real-Time Network Routing (RTNR)

The principles of this invention are illustrated in one embodiment referred to hereinafter as RTNR. RTNR is an adaptive routing scheme. For each call entering a network, the originating or access switch (ASW) analyzes the called number of the call and determines the terminating or destination switch (DSW) in the network for this call. The ASW will try to set up this call on a direct route to the DSW first. To do this, the ASW simply checks if it has any available 1-way outgoing or 2-way communication paths or trunks to the DSW; if so, the ASW will set up the call on a direct trunk to the DSW. This particular mode, being part of the prior art, is not shown in any of the illustrative routing diagrams but is shown in the flow diagrams.

If a direct trunk to the DSW is not available, the ASW will determine a route by trying to find an available 2-link path through the network to the DSW. In fact, the ASW finds all of the available 2-link routes to the DSW, and chooses a route containing the most lightly loaded communication path groups or trunk groups.

Any available 2-link route between the ASE and the DSW goes through an intermediate switch (ISW) to which the ASW has one or more idle outgoing trunks, and from which the DSW has one or more idle incoming trunks. In order to determine all of the ISWs in the network which satisfy these criteria, the ASW first asks the DSW to send a list of the switches at the far end of all of its (the DSW's) trunk groups that have available incoming trunks. The DSW also indicates the load status of these trunk groups. The ASW then compares the above list received from the DSW with a list of the switches at the far end of all of the ASW's trunk groups that have available outgoing trunks. Any switch that appears in both lists can be used as an ISW to set up a 2-link connection for this call. A switch that has lightly loaded trunk groups from the ASW and to the DSW will be chosen as the ISW for this call in preference over a switch that has a heavily loaded trunk group either from the ASW or to the DSW.

In order to respond optimally to peak traffic loads, RTNR limits the use of heavily loaded trunk groups for 2-link connections. This limitation increases the amount of direct traffic (or 1-link connections) between the two switches connected by a heavily loaded trunk group. This ensures a high completion rate for calls between these two switches, and increases the throughput of the network. A heavily loaded trunk group is only used in a 2-link connection for a call between two switches which have been experiencing substantial blockage for recent call attempts between these two switches. For such calls, the use of heavily loaded trunk groups will help improve the completion rate for calls between these two switches.

In order to further enhance the performance of the network, heavily loaded trunk groups may be placed in a reserved state to further increase the amount of direct traffic on the group. The reserved state is only used when the blocking rate for calls between the two switches connected by the trunk group exceeds a grade of service objective. By controlling the use of heavily loaded and reserved trunk groups for 2-link connections, the completion rate for calls between switches that have not been meeting their grade of service objectives can be improved while possibly increasing the blocking rate for calls between pairs of switches that are within their grade of service objectives. As a result, blocking is spread across switch pairs as much as possible so that few, if any, switch pairs in the network fail to meet the grade of service objective for blocked call attempts between each pair of switches. These controls also increase the traffic throughput of the network by maximizing the number of calls carried on direct trunks, i.e., 1-link connections.

1.2 Trunk Groups and Trunk Group Load States

From the perspective of any switch, for example, Switch A, there are three kinds of trunks between Switch A and some other switch, for example Switch B; there are 1-way outgoing trunks to B, 1-way incoming trunks from B, and 2-way trunks. Once again using Switch A's perspective, A's outgoing trunk group to B is defined to include all of the 1-way outgoing trunks to B, as well as all of the 2-way trunks between A and B. Switch A's incoming trunk group from B includes all of the 1-way incoming trunks from B, and also all of the 2-way trunks between A and B. Note that 2-way trunks are considered to be members of both the incoming and outgoing trunk groups.

The load status for a trunk group is based on the number of available trunks in the group. A discrete number of load states are defined, and an available trunk threshold value is set for each load state. In the examples described with respect to FIGS. 1-10, four load states (lightly loaded, heavily loaded, reserved, and busy) are illustrated to keep the description concise. If the number of available trunks in a group exceeds the lightly loaded state threshold, e.g., more than 5% of the total number of trunks in the group are available, then the group is considered to be lightly loaded. If the number of available trunks in the group is less than the lightly loaded state threshold but greater than the heavily loaded state threshold, e.g., somewhere between one trunk and 5% of the total number of trunks in the group, then the group is considered to be heavily loaded. When none of the trunks in a group are available, the group is considered busy. Use of additional load states introduces additional checking steps, but does not otherwise affect the basic principle of operation. As discussed in section 1.12, better performance is obtained using six different load status values.

The reserves state is only used for a trunk group when the number of blocked calls between the two switches connected by the trunk group exceeds a grade of service objective. When this condition occurs, a reserved state threshold is set based on the level of blockage. The load state thresholds for both the heavily loaded and lightly loaded states are adjusted upwardly by the amount of the reserved state threshold.

The arrangement for placing a trunk group into the reserved state is as follows. Periodically, for example, once per minute, the switch multiplies the number of calls attempted to the switch at the other end of the trunk group in the period, by the blocking grade of service objective for these calls, (e.g., 1%), to determine the maximum number of call attempts which could be blocked and still meet the grade of service objective; this is hereafter referred to as the blocked call objective. If the number of calls blocked during the period is greater than the blocked call objective, then the grade of service objective has not been met over the previous period. When this occurs, the reserved state will be used for the trunk group during the next measurement period.

Two alternatives can be used to set the load state thresholds for a trunk group.

One alternative is to set these thresholds based on the total number of trunks in the group. The base heavily loaded and lightly loaded thresholds are set to a fixed percentage of trunks in the group. The reserved state threshold is set to different percentages of trunks in the group based on the blocking rate for calls between the two switches connected by the trunk group. At the end of each measurement period, the node-to-node blocking rate is checked to determine if a reserved state threshold should be set; if so, the heavily loaded and lightly loaded threshold values are adjusted upward from their base values by the amount of the reserved state threshold. These load state thresholds will be used for the trunk group throughout the next measurement period. Table I illustrates an exemplary set of reserved state thresholds based on trunk group size. Table II illustrates an exemplary set of heavily loaded and lightly loaded state thresholds based on trunk group size.

TABLE I

| N-N Block % | Rsvd Thr Based on Trunk Size |
| --- | --- |
| <1 | 0 |
| 1-5 | (5% of Trunks in Group; Min 2, Max 10) |
| 5-15 | (10% of Trunks in Group; Min 4, Max 20) |
| 15-50 | (15% of Trunks in Group; Min 6, Max 30) |
| >50 | (20% of Trunks in Group; Min 8, Max 40) |

TABLE II

| # Available Trks in Grp | Load State |
| --- | --- |
| 0 | Busy |
| >0, ≦Rsvd Thr | Reserved |
| >Rsvd Thr, ≦Rsvd Thr + 5% Trks in Grp | Heavily Loaded |
| >Rsvd Thr + 5% Trks in Grp | Lightly Loaded |

The second alternative is to base the load state thresholds for a trunk group on the call load between the two switches connected by the trunk group being presented, or offered, to the network. For this alternative, an exponentially smoothed approximation of the offered call load between two switches is made at the end of each measurement period. The base heavily loaded and lightly loaded state thresholds used for the trunk group connecting these two switches are set to fixed percentages of the offered call load between these two switches; these thresholds will be used for the trunk group during the next measurement period. Dynamically adjusting load state thresholds upward as the offered call load rises increases the amount of direct routed traffic in the network. Adjusting these thresholds downward as the offered call load falls allows a trunk group which does not have much direct traffic to carry to be used for more 2-link connections. Both actions help increase the call throughput to the network.

At the end of each measurement period, the node-to-node blocking rate for calls between two switches is checked to determine if the grade of service objective for these calls was met. If the objective was not met, a reserved state threshold for the trunk group connecting the two switches is set to the difference between the offered call load between these switches and the current number of completed calls between these switches that are still connected, subject to an appropriate upper limit. The reserved state threshold will be adjusted continuously throughout the next measurement period to reflect the difference between offered call load and completed calls. Every time a new call between these two switches completes, either over the direct route or over a 2-link route, the reserved state threshold for the trunk group connecting these two switches is decremented. Likewise, whenever a call between these two switches disconnects, the reserved state threshold is incremented. An appropriate upper limit is used for these reserved state thresholds. In this case, the reserved state threshold for a trunk group is the number of additional calls that need to be completed between the two switches connected by the trunk group in order to reach the offered call load target with an appropriate upper limit as shown in Table III, below. This is the number of available trunks in the trunk group that will be reserved for direct traffic only, and therefore ensure that the offered call load target for these two switches can be reached. Once the number of completed calls between these two switches indeed reaches the offered call load target, the reservation of available trunks for direct traffic only is stopped. This reservation control is turned back on and back off throughout the measurement period as the number of completed calls between these two switches oscillates around the offered call load target.

Table III illustrates an exemplary set of reserved state thresholds based on offered call load and node-to-node blocking. Table IV illustrates an exemplary set of heavily loaded and lightly loaded state thresholds based on offered call load.

TABLE III

| N-N Block % | Rsvd Thr Based on Forecasted Load |
|---|---|
| <1 | 0 |
| 1-5 | Min [Max (0, OCL-CCL), (5% OCL; Min 2, Max 10)] |
| 5-15 | Min [Max (0, OCL-CCL), (10% OCL; Min 4, Max 20)] |
| 15-50 | Min [Max (0, OCL-CCL), (15% OCL; Min 6, Max 30)] |
| >50 | Min [Max (0, OCL-CCL), (20% OCL; Min 8, Max 40)] |

OCL - Offered Call Load
CCL - Current Call Load

TABLE IV

| # Avail Trks in Grp | Load State |
|---|---|
| 0 | Busy |
| >0, ≦Rsvd Thr | Reserved |
| >Rsvd Thr, ≦Rsvd Thr + 5% OCL | Heavily Loaded |
| >Rsvd Thr + 5% OCL | Lightly Loaded |

1.3 Choosing the Most Lightly Loaded Routes

Choosing the most lightly loaded 2-link routes to set up calls is an important aspect of RTNR because this dynamically and continuously distributes traffic across the trunk groups in the network to achieve high trunk utilization.

The load status for a 2-link route is based on the load conditions of the two trunk groups that form that route. The load states used for trunk groups are applied to routes also. The load state of a route is the higher load state found on either of the trunk groups that form the route. If both of the groups are lightly loaded, the route is lightly loaded. If one group is lightly loaded, but the other group is heavily loaded, then the route is heavily loaded; a route is also heavily loaded if both groups in the route are heavily loaded. If one group of the route is in the reserve state, then the route is in the reserve state. Lastly, if either group in the route is busy, the route is busy.

When choosing a 2-link route for a call, the ASW will use a lightly loaded route if one is available. If only heavily loaded routes are available, one of them can be used to set up the call depending on the blocking conditions in the network. Lastly, if only reserved routes are available, one of them can be used to set up the call. If no direct route is available, and all of the 2-link routes are busy, the call will be blocked due to a no circuit condition.

RTNR controls the use of heavily loaded and reserved routes in order to meet grade of service objectives between as many pairs of switches as possible, and to maximize the traffic throughput of the network. When a trunk group becomes heavily loaded, it should be used primarily for new calls between the two switches connected by the trunk group; limiting the number of new 2-link connections using this trunk group protects the completion rate for a call between the two switches connected by the trunk group. Specifically, the only new 2-link connections allowed on a heavily loaded route are for calls between a pair of switches which have not been meeting their grade of service objective. Allowing these calls to complete over heavily loaded 2-link routes will help in meeting the grade of service objective for these calls.

A trunk group is only placed in the reserved state when there is substantial blocking for calls between the two switches connected by the trunk group. In this case, it is important to protect direct traffic on the group by further limiting the number of new 2-link connections allowed on the group. A 2-link connection can only be set up on a reserved route for a call between a pair of switches which have not been meeting their grade of service objective, and which are not connected by a direct trunk group; if a pair of switches is connected by a direct trunk group, this trunk group can be placed in a reserved state thus avoiding the need to use 2-link reserved routes.

In order to find the most lightly loaded 2-link routes available to a DSW, the ASW does the following. The ASW first requests the DSW to send three lists of switches; a list of the Switches at the far end of the DSW's Lightly Loaded Incoming Trunk Groups (LLITGS list), a list of the Switches at the far end of the DSW's Heavily and Lightly Loaded Incoming Trunk Groups (H&LLITGS list, and a list of the Switches at the far end of the DSW's Reserved, Heavily loaded, and Lightly Loaded Incoming Trunk Groups (RH&LLITGS list).

Upon receiving these lists, the ASW first compares a list of the Switches at the far end of its (the ASW's) Lightly Loaded Outgoing Trunk Groups (LLOTGS list) with the DSW's LLITGS list. If there are any switches that appear in both of these lists, one of them will be used as the ISW for the call; the 2-link route from the ASW tot he DSW through this ISW is a lightly loaded route. If no switch appears in both of these lists, then there are no lightly loaded 2-link routes between the ASW and the DSW. If a heavily loaded route can be used for this call, the ASW will compare a list of the Switches at the far end of its Heavily and Lightly Loaded Outgoing Trunk Groups (H&LLOTGS list) with the DSW's H&LLITGS list. If there are any switches that appear in both of these lists, one of them will be used as the ISW of a heavily loaded route for the call. Finally, if a reserved route can be used for this call, the ASW will compare a list of the Switches at the far end of its Reserved, Heavily loaded, and Lightly Loaded Outgoing Trunk Groups (RH&LLOTGS list) with the DSW's RH&LLITGS list to see if there are any switches in both of these lists which can be used as the ISW of a reserved route for the call.

1.4 Traffic Load on Trunk Groups Using RTNR

FIGS. 1-10 show how various routing problems are solved in an exemplary 8 node network with the nodes located as follows: node 1, Chicago; node 2, Atlanta; node 3, San Francisco; node 4, Phoenix; node 5, Los Angeles; node 6, New York; node 7, Denver; node 8, Dallas. Trunk groups exist between the following pairs of nodes: 1,2; 1,6; 1,7; 1,8; 2,5; 2,6; 2,8; 3,4; 3,5; 3,6; 3,7; 3,8; 4,5; 4,7; 4,8; 5,6; 6,8; and 7,8. In this exemplary network, all the trunks are 2-way trunks. In each of the diagrams, the status of the significant trunk groups is marked as follows: LL signifies lightly loaded, HL signifies heavily loaded, R signifies reserved status, and B signifies blocked (all trunks busy). In each of the figures, there are a number of status words, each 8 bits long and each reflecting some type of availability between a designated node and all other nodes of the system. The availability words are identified by a series of initials having the following meaning: LL—lightly loaded; H&LL—heavily and lightly loaded; R,H&LL—reserved, heavily, and lightly loaded; ITG—incoming trunk group; OTG—outgoing trunk group; S—far end switch; ISW—intermediate switch; R—routing; AISW—accessible intermediate switch.

First consider an example of how trunks between the Atlanta and Chicago switches are used. Assume that the lightly loaded idle threshold is 5% for the Atlanta-Chicago trunk group, i.e., more than 5% of the trunks must be idle for the group to be marked as lightly loaded.

If there is a low call load between Chicago and Atlanta, this trunk group will be able to carry this traffic, and be used for calls between Chicago and other switches, as well as for calls between Atlanta and other switches. For example, if the switch in Dallas does not have any direct trunks to Chicago available, it could set up a call to Chicago over the 2-link route of Dallas to Atlanta to Chicago. See FIGS. 1 and 2.

Once 95% of the trunks in this group are being used for either direct or 2-link calls, the group is marked heavily loaded. New traffic between Atlanta and other switches, and between Chicago and other switches, is then distributed over other routes in the network that are still lightly loaded, rather than being set up over this trunk group. 5% of this trunk group is still available to be used as direct connections for new calls between atlanta and Chicago.

As calls previously set up over trunks in this group disconnect, the trunks used for those calls are idled. If new calls between Atlanta and Chicago arrive at a slower rate than the old calls disconnect, the number of idle trunks in the group eventually will exceed the 5% threshold. When this happens, the group is marked lightly loaded, and will be used again for new 2-link calls between Chicago and other switches, or between Atlanta and other switches.

However, once the group reaches the heavily loaded state, if new calls between Atlanta and Chicago arrive as fast or faster than the old calls disconnect, the number of idle trunks in the groups will remain below the 5% threshold. In this state, the group is, in effect, dedicated for calls between Atlanta and Chicago only. Once the call load between these two switches exceeds the capacity of this group, Atlanta will begin looking for 2-link routes to Chicago, and vice versa.

1.5 Lists of Far End Switches of Available Trunk Groups

As described earlier, with respect to the example of FIGS. 1-10, a switch needs to keep lists of the switches at the far end of available trunk groups; there is a LLITGS list, a LLOTGS list, a H&LLITGS list, a H&LLOTGS list, a RH&LLITGS list, and a RH&LLOTGS list.

The switch identifiers used in these lists must be recognized by all of the other switches in the network. Therefore, each switch in the network is assigned a unique Network Switch Number (NSN). In the example depicted in FIG. 1, there are eight switches in a network, which have been assigned NSNs one through eight arbitrarily, corresponding to the node numbers previously discussed. The NSN2 are used as the identity of the switches in the list of switches at the far end of available trunk groups, e.g., the LLITGS list. Once again referring to FIG. 1, the Chicago switch has two lightly loaded incoming trunk groups; one from New York and one from Atlanta. Chicago's LLITGS list contains the NSNs of these two switches, i.e., NSN 6 and NSN 2 respectively.

One very efficient implementation for these far end switch lists is bit map tables. Each bit map table would have a one bit entry for each NSN in the network; bit entry "i" in the table is set if the switch assigned NSN="i" is to appear in this list. Every time the load status of a trunk group changes, the switch sets or zeroes the appropriate bit for the far end switch of this trunk group in each of the LLITGS, LLOTGS, H&LLITGS, H&LLOTGS, RH&LLITGS, and RH&LLOTGS bit map tables accordingly.

Using these bit map tables also makes it easy for an ASW to compare one of its outgoing trunk group far end switch lists with a DSW's incoming trunk group far end switch list and find all of the switches that appear in both lists. For example, the ASW simply ANDs it LLOTGS bit map table with the LLITGS bit map table received from the DSW to produce a Lightly Loaded Route Intermediate SWitch (LLRISW) bit map table list. If bit entry "i" in the LLRISW bit map table is set, the switch assigned NSN="i" can be used as an ISW for a lightly loaded 2-link connection between the ASW and the DSW.

A bit map table is also a very compact way to store a far end switch list. For example, the list for each status level for a network with 256 switches only requires 32 bytes of data. This is very important consideration since this list needs to be sent frequently in a common channel signaling message.

1.6 Specifying a List of Allowed ISWs for a DSW

RTNR finds all of the available 2-link routes through the network between the ASW and the DSW for a call. Some of these routes can be many miles long. If the two trunk groups that form such a long route are not equipped with echo cancelers, the route may not provide good transmission quality for voice calls, For instance, referring to FIG. 3, there ar three available 2-link routes from Dallas to San Francisco; there are two relatively short routes via Phoenix and Denver respectively, and one very long route through New York. Even though the route through New York is available, is should not be used since it would not have acceptable transmission quality.

Therefore, network engineers need to be able to define which of the possible routes between two switches are allowed to be used when available. The Dallas switch has a list of intermediate switches that it is allowed to use to set up calls to San Francisco. The Dallas switch also will have an Allowed Intermediate SWitch (AISW) list specified for every other switch in the network.

Bit map table can be used for AISW lists also. Using the previous example, the Dallas switch can AND the LLRISW bit map table for San Francisco with its AISW bit map table for San Francisco to produce on Allowed, Lightly Loaded Route Intermediate SWitch (ALLRISW) bit map table list that only contains Phoenix and Denver. See FIGS. 3 and 4 for an illustration of this example.

1.7 Choosing One Route From a List of Allowed and Available Routes

Given a list of allowed and available routes to the DSW, any one of these routed can be used to set up the call. If a route is chosen from the list by some fixed algorithm, e.g., the first route to appear in the list is always used, then the 2-link traffic between two switches will always go over one particular route until that route becomes heavily loaded or bury. Once that occurs, all of this traffic then will be sent over the next route in the list.

However, if routes are chosen at random form this list, the 2-link traffic between two switches will be spread continually over the allowed and available routes. This should help keep trunk group loads balanced across the network.

To choose an ISW from an ALLRISW list bit map table, the ASW picks a random starting point in the bit map table, and starts a circular search through the table until an entry that is set is found. That entry identifies the NSN of the ISW to use for this call. One satisfactory choice of a random point is one position beyond the most recently used ISW for the route being searched.

Figures 3, 4:
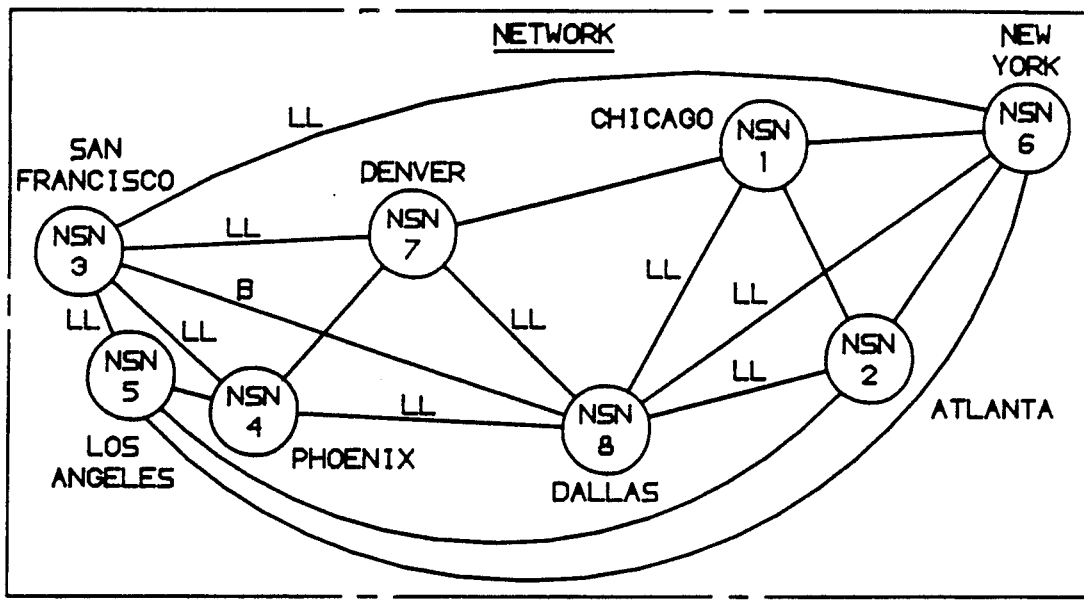

FIGS. 1 and 2 simply show Chicago's access pattern for lightly loaded groups (access to nodes 2 and 6, i.e., Atlanta and New York), and Chicago's lightly loaded and heavily loaded trunk group access pattern, i.e., nodes 2, 6, and 7 (to Atlanta, New York, and Denver). FIGS. 3 and 4 show the routing of a call from Dallas to San Francisco when the direct route between those two nodes (nodes 8 and 3) is busy. San Francisco has a lightly loaded incoming trunk group switch access pattern showing availability to nodes 4, 5, 6, and 7 (Phoenix, Los Angeles, New York, and Denver). Dallas's lightly loaded outgoing trunk group switch access pattern shows access to nodes 1, 2, 4, 6, and 7 (Chicago, Atlanta, Phoenix, New York, and Denver). As a result, 2-link lightly loaded routes are available via nodes 4, 6, and 7 (Phoenix, New York, and Denver). However, the intermediate switches that the Dallas node is allowed to use for routing calls to San Francisco only includes routes through nodes 4 and 7 since the transmission quality of a connection from Dallas to San Francisco via New York is likely to be unacceptable. As a result, the allowable routing ISW word has the bit positions for nodes 4 and 7 set to 1 so that the call from Dallas to San Francisco can be set up via either Phoenix or Denver.

Figures 5, 6:
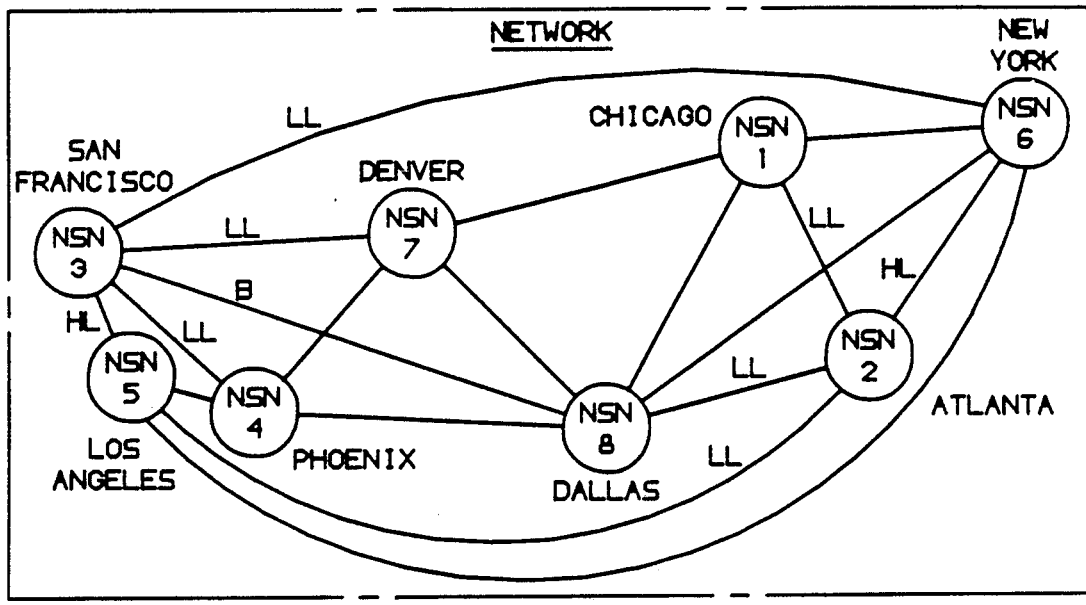
Figure 14:
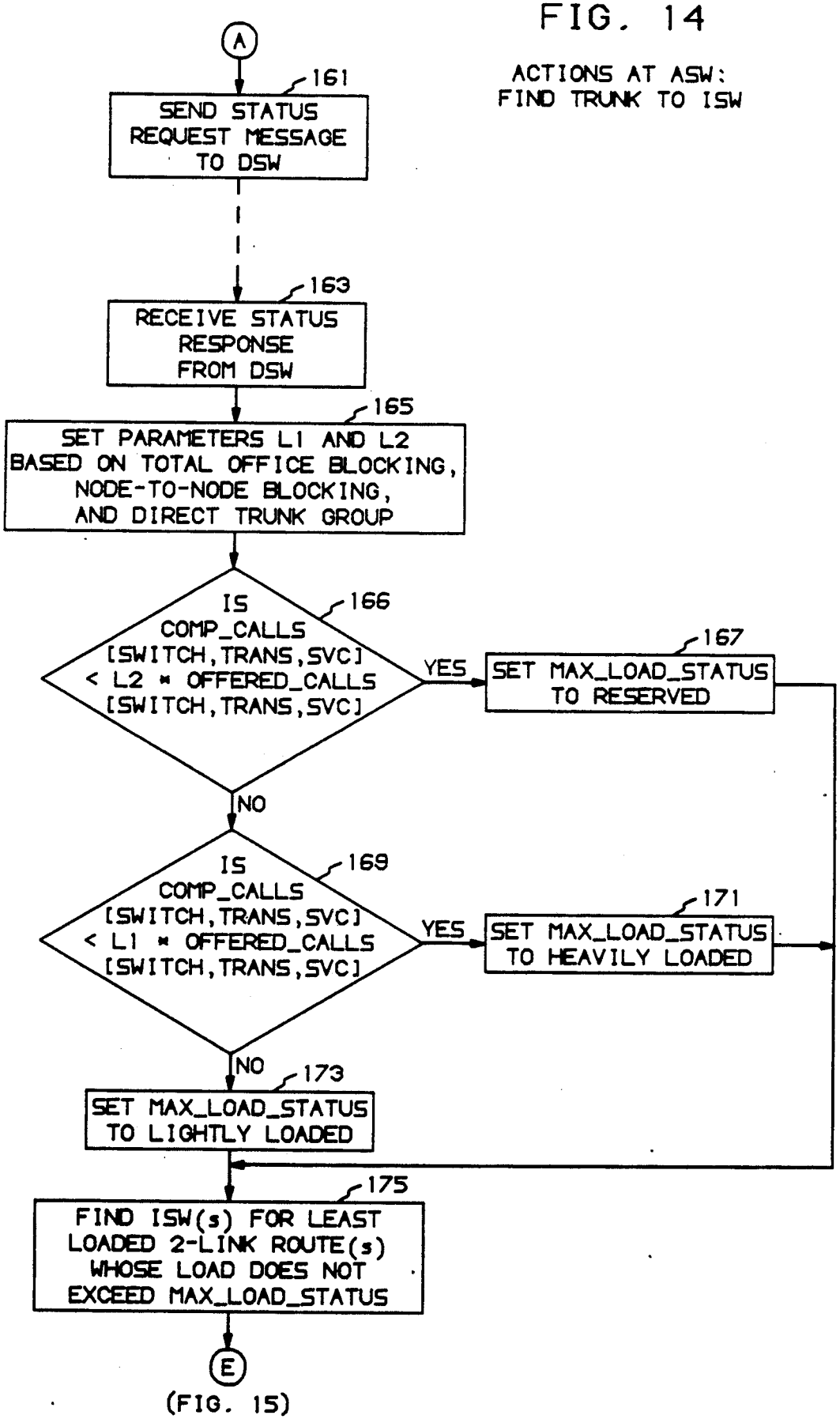
Figure 15:
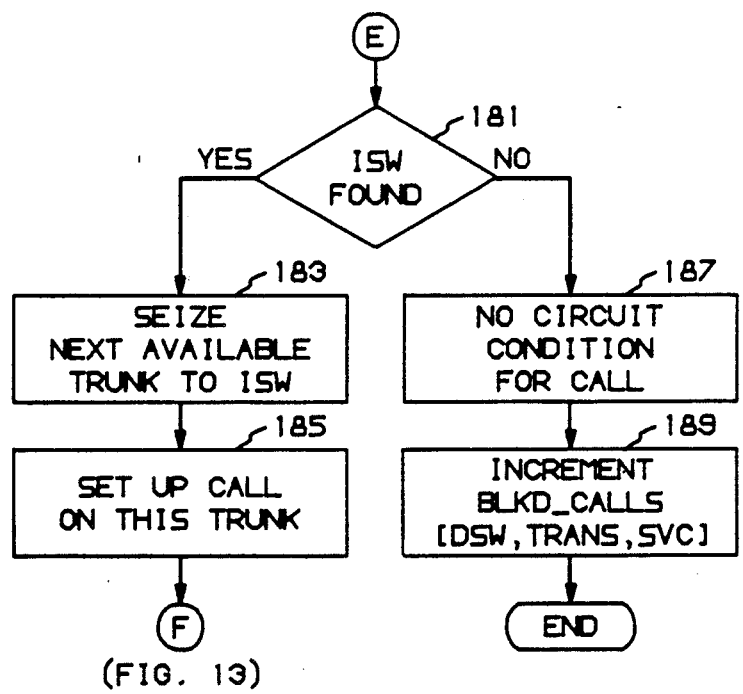

FIGS. 5 and 6 illustrate setting up a call from Atlanta to San Francisco under blockage states states which permit the use of heavily loaded as well as lightly loaded trunks (see discussion with respect to FIG. 14. San Francisco's pattern of access via lightly loaded incoming trunk groups is to nodes 4, 6, and 7 (Phoenix, New York, and Denver). Atlanta's lightly loaded access to outgoing trunk groups is limited to nodes 1, 5, and 8 (Chicago, Los Angeles, and Dallas). Atlanta's allowed intermediate switches for a call to San Francisco is via nodes 5, 6, and 8 (Los Angeles, New York, and Dallas). As a result, there are no intermediate switches accessible from both Atlanta and San Francisco via lightly loaded trunk groups. The picture changes when lightly or heavily loaded trunk groups may be used. San Francisco's access to lightly and heavily loaded incoming trunk groups is to nodes 4, 5, 6, and 7 (Phoenix, Los Angeles, New York, and Denver). Atlanta's access via lightly and heavily loaded outgoing trunk groups is to nodes 1, 5, 6, and 8 (Chicago, Los Angeles, New York, and Dallas). When this is combined with Atlanta's allowable intermediate switch pattern for calls to San Francisco, nodes 5, 6, and 8 (Los Angeles, New York, and Dallas), it is found that a call from Atlanta to San Francisco can be set up via nodes 5 or 6, Los Angeles or New York. Note that in both of these routes, one of the trunk groups that must be used is heavily loaded.

Figures 7, 8:
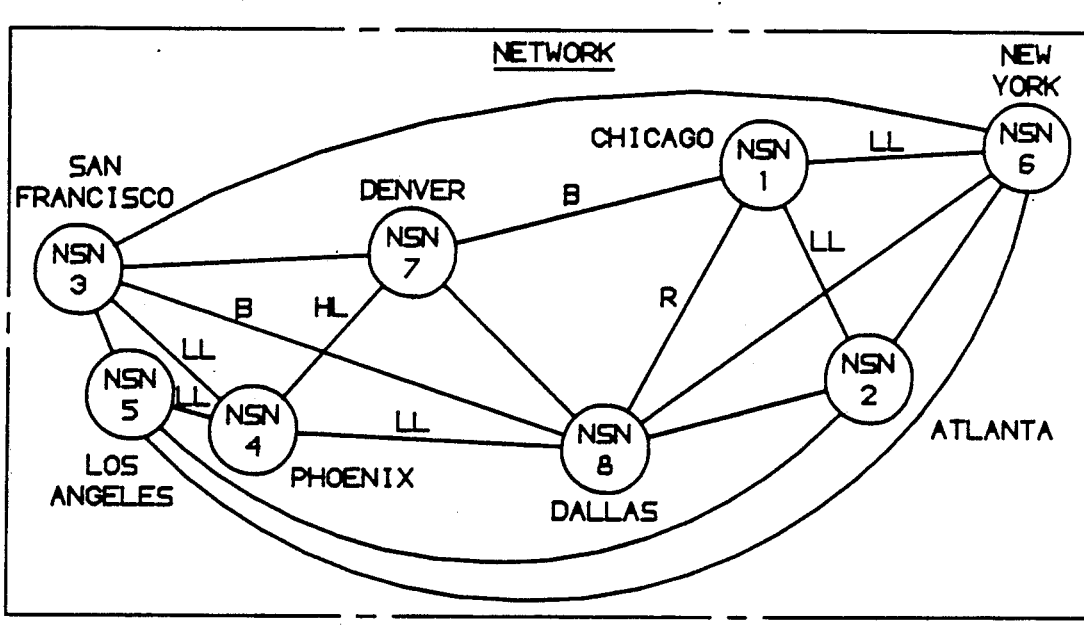

FIGS. 7 and 8 illustrate a call from Phoenix to Chicago in which no routes are available using either lightly loaded or heavily loaded trunk groups but one route is available using the trunk group between Dallas and Chicago which is in the reserved status. Calls using facilities in the reserve status may be set up only if they are over the direct route from the ASW to the DSW or if no direct facilities connect the ASW to the DSW. In this particular case, there are not direct trunk groups between Phoenix and Chicago (nodes 1 and 4) and it is assumed that the level of blockage is such that heavily loaded or reserved trunk groups may be used. In this particular case, the call from Phoenix to Chicago may be set up via Dallas using the Dallas to Chicago route which is in the reserved status.

Figures 9, 10:
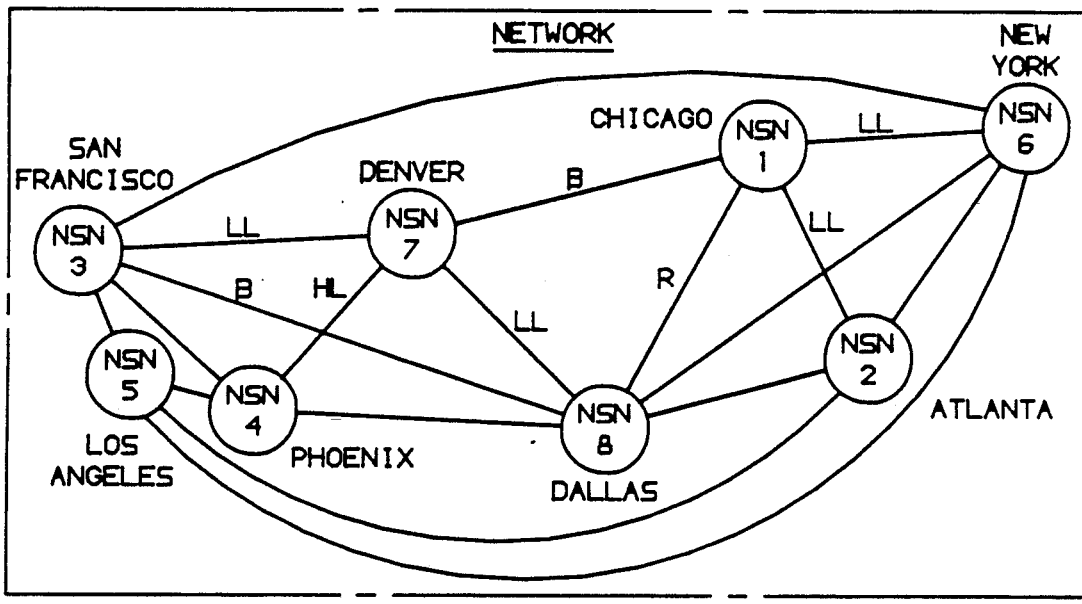
Figure 11:
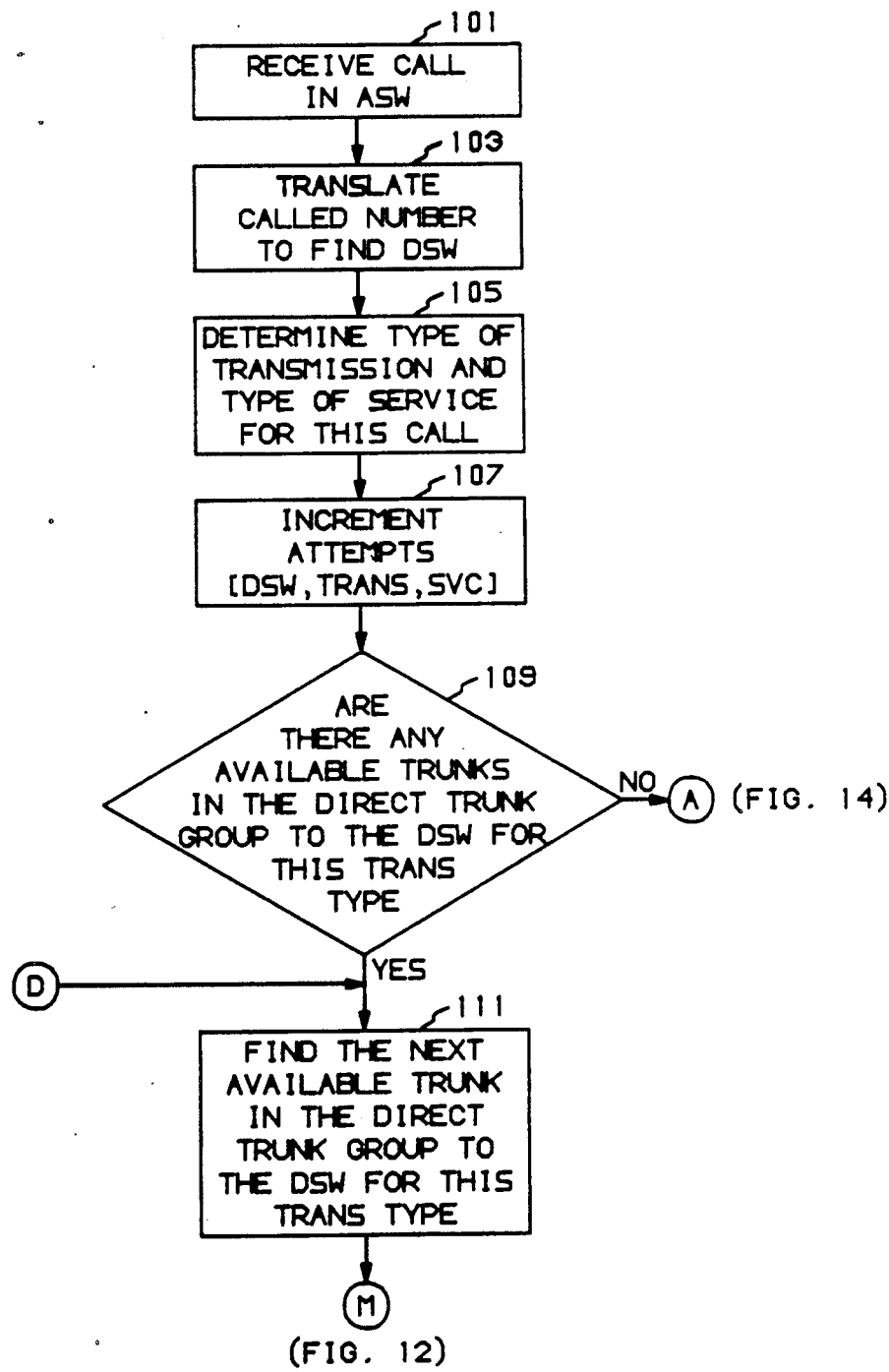
Figure 12:
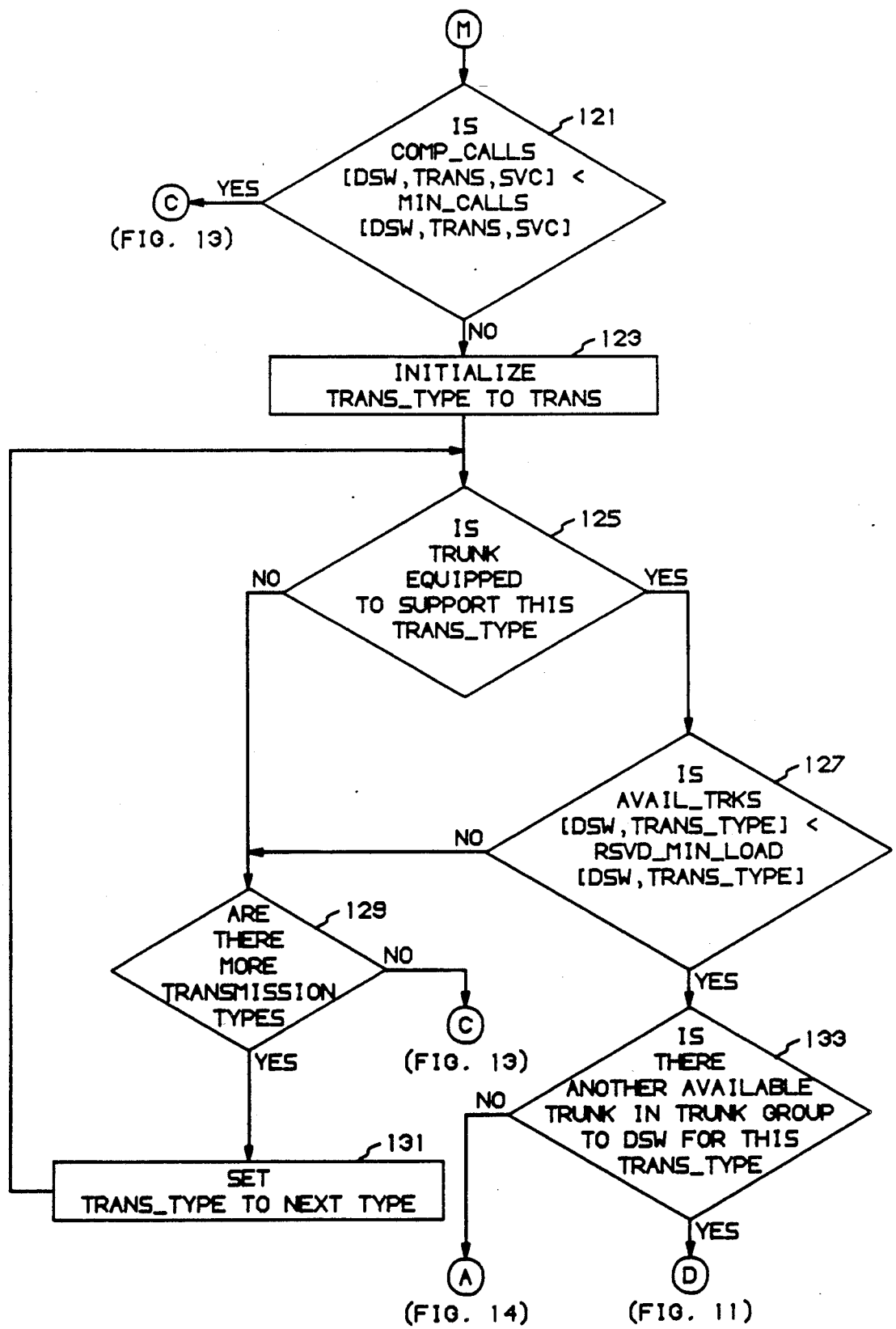
Figure 13:
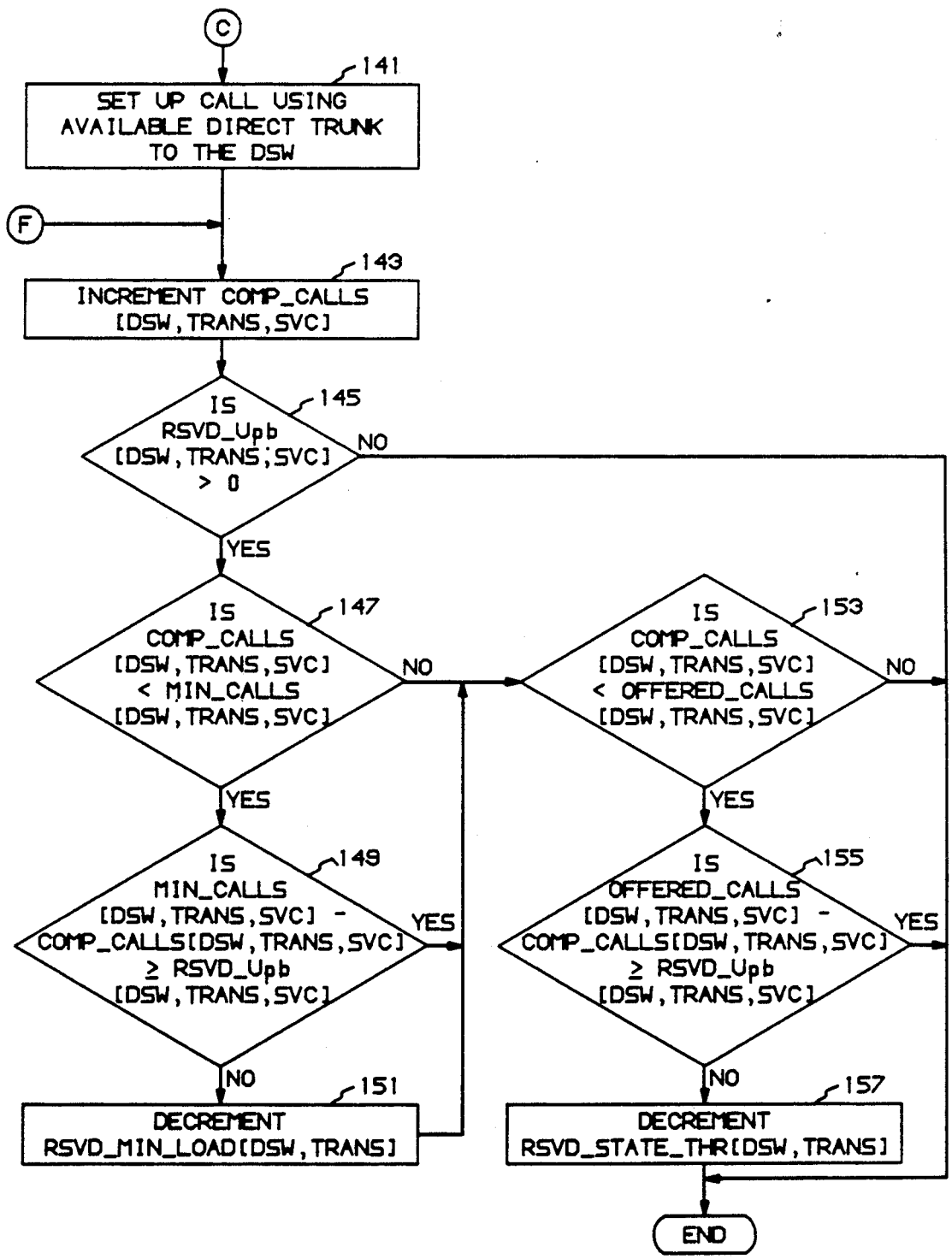

FIGS. 9 and 10 illustrate a call from Denver to Chicago, when the level of blockage over this route is sufficiently high so that heavily loaded trunk groups may be used. Note that Denver and Chicago are connected via a busy trunk group so that the option of using a reserved facility, for example, going via Dallas and using the reserved facility between Dallas and Chicago, is not permitted. In this particular case; Chicago can access nodes 2 and 6 (Atlanta and New York) via lightly loaded and heavily loaded incoming trunk groups and Denver can access nodes 3, 4, and 8 (San Francisco, Phoenix, and Dallas) via lightly and heavily loaded trunk groups; as a result, no intermediate switching point is accessible by either a lightly loaded or heavily loaded trunk group from both Denver and Chicago, and the call is therefore blocked.

A further check may be made to use a route having a combination of a lightly loaded and a heavily loaded trunk group in preference to a route having two heavily loaded trunk groups. This avoids the use of more heavily loaded trunk groups than is necessary.

Figure 27:
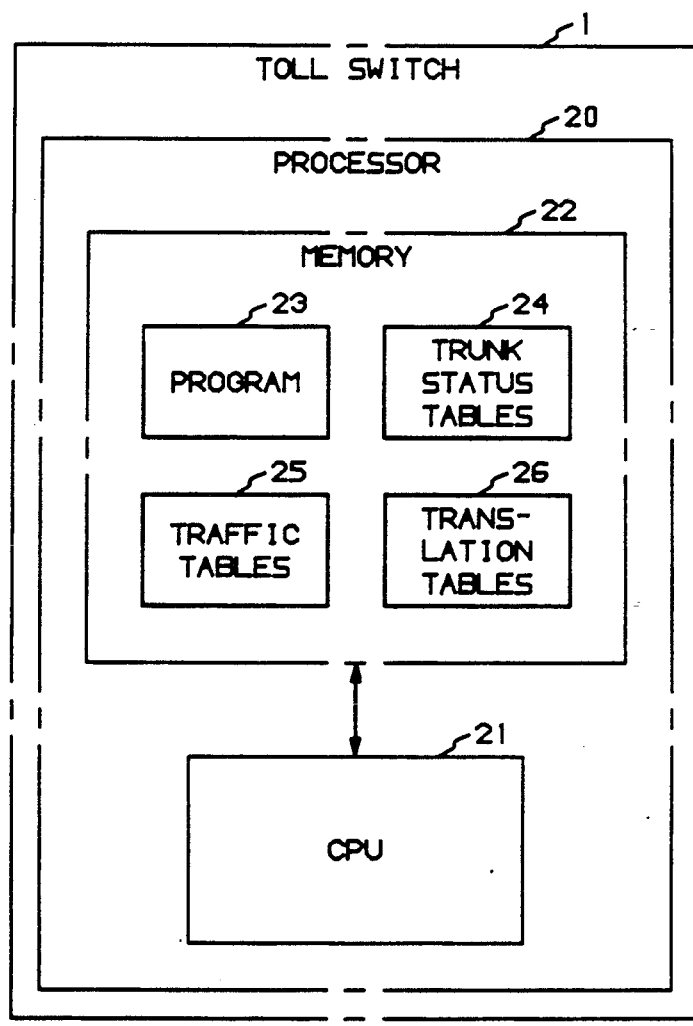
FIG. 27 is a block diagram of a switching system and signaling network for routing calls in accordance with the invention.

FIG. 27 is a block diagram of the pertinent portions of a toll switch used for practicing this invention and showing connections to a common channel signaling network for communicating data messages among the toll switches of the network. Toll switch 1 comprises a processor 20 that includes a central processing unit 21 and a memory 22. The memory includes a program 23 for controlling the operations specified in the flow charts of the diagram trunk status tables 24 indicating the availability of individual trunks and the level of availability of trunk groups traffic tables 25 for keeping track of the level of blockage for different kinds of services between different switches and translation table 26 for translating the number of call setup requests to the identification of a destination switch. Processor 20 is also connected via link 28 to a common channel signaling network 27 which is interconnected to other toll switches and which is used for transmitting data messages including the trunk group availability data messages between the toll switches of the network.

1.8 Setting Up a Call Through an Intermediate Switch

Once the ASW has selected an ISW, the ASW hunts for one of its available outgoing trunks to the ISW, and sets up the call on that trunk by sending an Initial Address Message (LAM) to the ISW.

Intermediate switches do their own analysis of the called number received in the IAM and make their own determination of the DSW for the call. The ISW hunts for an idle outgoing trunk to the DSW. Since the availability of this route was just checked, there should be idle trunks from the ISW to the DSW. There is the possibility, however, that these trunks have been used for calls set up between the time that the DSW sent is available ITGS lists and the time that the ISW is ready to hunt a trunk for the call; this should happen very infrequently.

In the rare instances when the ISW no longer has any available trunks to the DSW, the ISW could either block the call, or it could send a CRANKBACK message to the ASW. Upon receipt of the CRANKBACK message, the ASW would select another ISW, is there is one, and attempt to set up the call through this newly selected ISW. The ASW can find a new ISW by continuing its circular search of the ALLRISW bit map table starting from the NSN of the switch which just cranked the call back. In the solid line portion of the flow diagram shown in FIG. 16 depicting actions performed at the ISW, the ISW blocks the call due to a no circuit condition when it can not find an available outgoing trunk to the DSW. As discussed further in section 1.14, CRANKBACK is another option and can be used as an alternative to simply considering the call to be blocked at this point.

1.9 Resilience to Network Failures and Unusual Traffic Patterns

Not only does RTNR check network status on a call-by-call biases, but it is also able to check and use any of the 2-link paths in the network. Because of this, RTNR provides a high degree of resiliency to network failures. RTNR will react automatically and immediately to troubles in the network, e.g., a switch outage or carrier failure, and route around the failure as much as possible. RTNR is also to react automatically to unusual traffic patterns, e.g., those that occur on Mother's Day or following an earthquake in California.

1.10 Using RTNR for Voice, Data, and Broadband Calls

So far, this description has only described the use of RTNR for setting up voice calls in a network. RTNR can be applied to 56 kilobit/second (KBPS) data calls, 64 KBPS data calls, broadband data calls, and calls for whatever other transmission capabilities are supported by the switch. For each transmission capability supported by RTNR, a separate set of trunk groups, containing the circuits with this transmission capability, is specified in the switch. In addition, another set of lists of far end switches of these trunk groups which are available is maintained.

Figure 21:
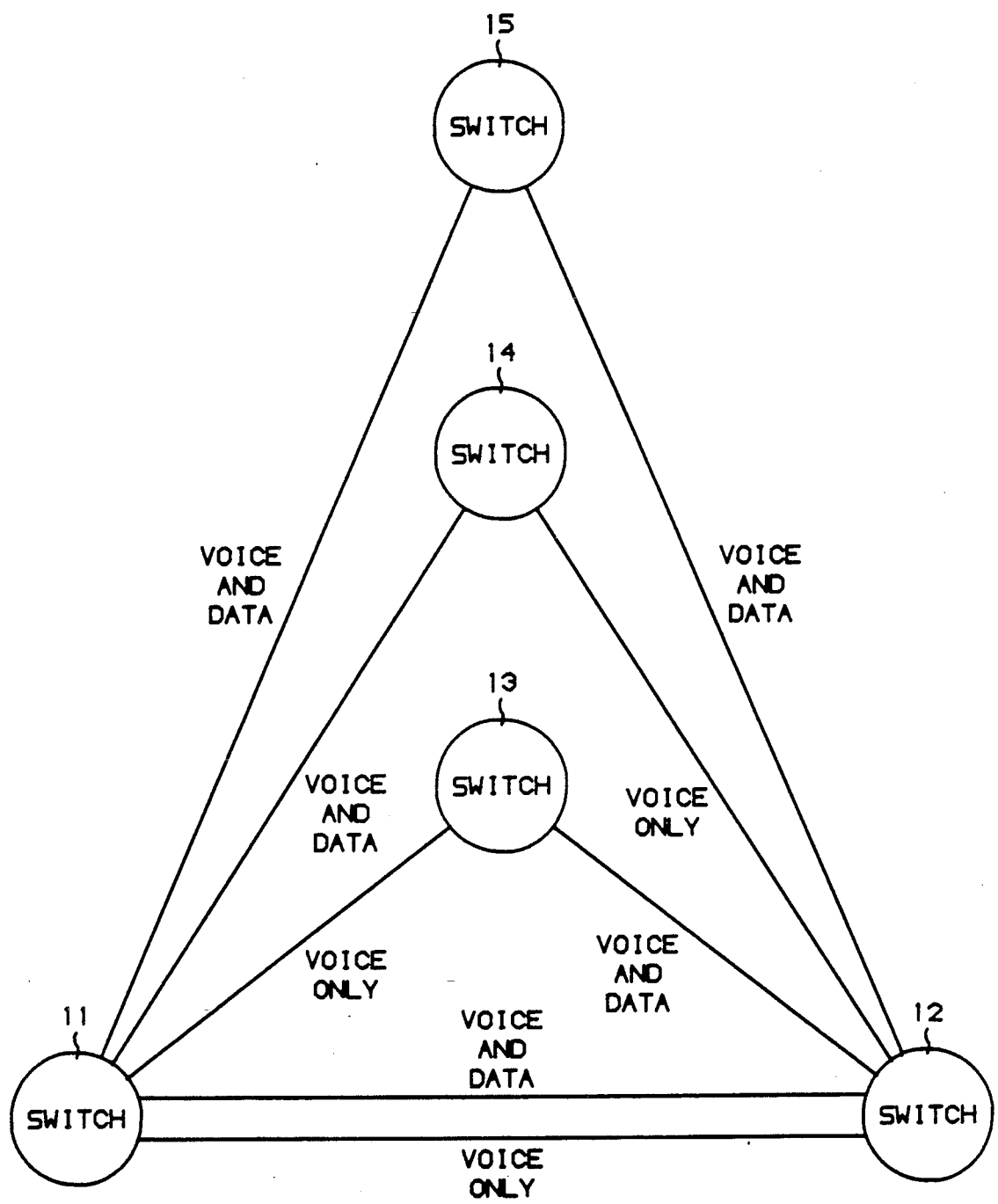
FIG. 21 illustrates routes supporting different types of transmission.

FIG. 21 illustrates connections between switches which make it desirable to maintain these separate counts of available trunks for supporting different transmission types. Switches 11 and 12 are directly connected by two group of facilities, one supporting voice-only and one supporting voice and data. When all of these trunks are idle, the number of available trunks in the voice trunk group is the sum of the number of trunks in both groups of facilities; the number of available trunks in the data trunk group is the number of trunks in the voice and data facilities group. However, switches 11 and 13 are connected by voice-only trunks which cannot even be used for transmitting data. Whereas switches 13 and 12 are connected by a single combined voice and data group. When a voice call is routed via switch 13, the capacity of the trunk group between switches 12 and 13 to support data is reduced. The same thing is true for connections between switches 11 and 12, using switch 14 wherein the trunk group between switches 11 and 14 supports both voice and data. Whereas, the trunk group between switches 14 and 12 supports only voice. Finally, the connections between switches 11 and 12 via switch 15 are over combined voice and data trunks in both links of the connections, thus, setting up either a voice or a data call between switches 11 and 12 via switch 15 reduces the number of trunks available for the other type of transmission.

For example, in order for a switch to use RTNR for both voice and 56 KBPS data calls, a switch would have voice trunk groups and 56 KBPS data trunk groups to and from other switches in the network. The switch also would have a list of far end switches of lightly loaded incoming voice trunk groups, a list of far end switches of lightly loaded incoming 56 KBPS data trunk groups, etc.

When a switch wants to set up a 56 KBPS data call, it first checks for an idle circuit in the outgoing 56 KBPS data trunk group to the DSW; if one is found, the call will be set up on this direct data trunk to the DSW. If no direct 56 KBPS data trunk is available, the switch will ask the DSW to send a list of the far end switches of lightly loaded incoming 56 KBPS data trunk groups. With this information, the ASW will pick an ISW for this call, hunt an idle circuit in the outgoing 56 KBPS trunk group to the ISW, and set up the call on this trunk.

In many cases, voice and data trunk networks are completely separated. The trunks between two switches are split into dedicated trunk groups, i.e., some of the trunks are only used for voice calls, and the remaining trunks only carry 56 KPBS data calls. Separate networks under-utilize trunks. For example, a voice call will be blocked when all of the voice trunks are busy, even through one or more of the trunks dedicated for the 56 KBPS calls is available.

In an integrated network, suitably equipped trunks can be used for many types of calls, e.g., both voice and 56 KBPS data calls. When a trunk is used this way, it is considered a member of both the voice trunk group and the 56 KBPS data trunk group to the far end switch. When such a trunk is either seized or released, the count of the available trunks in both the voice and 56 KBPS data trunk group is decremented or incremented respectively.

An integrated network is engineered to handle the combined forecasted call loads between two switches for many transmission types. An integrated network has the flexibility to handle c call overload between two switches for one transmission type if the traffic load between these two switches for the other transmission types are sufficiently under their engineered levels. An extreme call overload between two switches for one transmission type may cause calls between the two switches for all the transmission types to be blocked.

It is desirable to be sure that some minimum number of calls between two switches requiring a particular transmission type can be completed regardless of the call loads between the two switches for the other transmission types.

This can be accomplished by reserving available trunks for new attempts between the two switches connected by the trunks which require a particular transmission capability when the blocking objective for these types of calls is not being met, and the current number of completed calls between these two switches which required this transmission type is less that the pre-specified minimum call load desired to be provided for these type of calls. The number of available trunks is the difference between the minimum call load level desired between the two switches for this transmission type and the current completed call load between these two switches with this transmission type. Once this number of available trunks have been reserved any additional available trunks can be used to complete calls requiring a different transmission capability, In addition to setting and meeting different blocking objectives for calls that use different transmission capabilities, it is also desirable to be able to set and meet different blocking objection for different type of calls that all require the same transmission capability. For example, in other to maximize the earnings from voice call, the blocking objective for high revenue international voice calls could be set lower than the blocking objective for domestic voice calls. RTNR can meet different blocking objectives for different type of calls by controlling the use of direct and 2-link routes based on the load status of trunk groups and the blocked call measurements for each type of call on per call basis.

By applying trunk reservation and controlling the use of heavily loaded 2-link routes on the basis of service and/or transmission type, the performance of a multi-service network with integrated transmission capabilities can be optimized in terms of meeting the blocking objectives for all of the services and transmission types.

1.11 Actions performed in the ASW, ISW and DSW

FIGS. 11-20 are flow diagrams of actions performed in the ASW, ISW, and DSW in routing calls. In these diagrams and FIGS. 22-26, DSW and switch are used interchangeably since the switch referred to therein is the DSW. FIGS. 11-15 are flow diagrams of actions performed in the ASW in response to receiving a call in order to route the call. A call is received in the ASW (action block 101). The ASW translates the incoming call directory number to find the DSW to which the call should be routed (action block 103). The transmission capability required for this call and the service type for the call is determined (action block 105). The counter for the number of call attempts to this DSW with this transmission type and this type of service is incremented (action block 107).

Next, test 109 is made to check whether there are any available trunks in the trunk group to the DSW for this transmission type. If so, then the next available trunk in this trunk group is found (action block 111).

Test 121 (FIG. 12) determines whether the current number of calls completed to this DSW with this transmission and this service type is less than the minimum desired call load level to this DSW for this transmission and this service type. If so, the call is set up on this available direct trunk to the DSW (action block 141, FIG. 13), and the count of the number of completed calls to this DSW with this transmission and this service type is incremented (action block 143).

Now that another call to this DSW with this transmission and this service type has been completed, the system checks if any reservation controls for this type of call need to be adjusted. If the upper bound for the number of trunks to reserve for calls to this DSW with this transmission and this service type is zero (test 145), then no reservation controls are in effect, and all of the actions the ASW needs to perform to route this call have been completed.

If the result of test 145 is positive, then reservation controls are in effect for this type of call. Test 147 checks if the reservation control used to provide a minimum desired call load level for this type of call applies; if the just-incremented number of completed calls to this DSW with this transmission and this service type is still less than or equal to the minimum desired call load level for this type of call, then available trunks are being reserved for this type of call. If the difference between the minimum desired call load level for this type of call and the number of completions for this type of call is less than the upper bound for the number of trunks to reserve for this type of call (test 149), then the number of available trunks in this trunk group to be reserved for services not completing a minimum desired number of calls is decremented (action block 151). If the result of test 147 is negative or test 149 is positive, action block 151 is bypassed.

Next, test 153 checks if the reservation control used to keep available trunks from being used for 2-link connections until the completed call load for this type of call reaches the offered load level target for this type of call applies; if the just-incremented number of completed calls to this DSW with this transmission and this service type is still less than or equal to the offered call load level for this type of call, then available trunks are being reserved for this type of call. If the difference between the offered call load level for this type of call and the number of completions for this type of call is less than the upper bound for the number of trunks to reserve for this type of call (test 155), then the reserved state threshold for this trunk group is decremented (action block 157). If the result of test 153 is negative or test 155 is positive, then action block 157 is bypassed. All of the adjustments to the reservation controls have now been completed, and the ASW has now done all the actions needed to route this call.

If test 121 (FIG. 12) determines that the minimum desired number of calls to this DSW with this transmission and this service type have been completed, the system needs to check if this available trunk to the DSW is being reserved for another type of service that has not completed a minimum desired call load level to the DSW but is experiencing excessive blocking. This check must be done for each trunk group that this available trunk belongs to. The first transmission type supported to this DSW will be processed first (action block 123). If this available trunk is equipped to support this transmission type (test 125), then the system checks if the number of available trunks in the trunk group for this transmission type is less than the number of available trunks in this trunk group that are to be reserved for services unable to complete a minimum desired number of calls (test 127). If the result of test 127 is negative, test 129 determines if there are more transmission type supported to this DSW. If there are, the transmission type is set to the next type (action block 129), and the system proceeds to check if this available trunk is being reserved for a service defined for this transmission type (test 125). If there are no more transmission types supported to this DSW (test 129), then this available trunk can be used to complete this call (action block 141, FIG. 13).

If the result of test 127 is positive, then this available trunk to the DSW needs to be reserved for some other service, and therefore cannot be used to complete this call. Test 133 is used to check if there is another available trunk in the direct trunk group. If so, then the sequence of actions starting with action block 111 (FIG. 11) is repeated. If not, or if the result of test 109 (FIG. 11), previously described for checking whether there were any available trunks in the direct trunk group, is negative, then the actions associated with trying to find an appropriate 2-link route to the DSW, described in FIG. 14, are performed.

The first step of checking to find an available 2-link route is to send a status request message to the DSW (action block 161). In response to the reception of the status request message, the DSW performs the actions described infra with respect to FIG. 17. The DSW transmits a status response message which is received at the ASW (action block 163). As discussed hereinafter in section 1.12, optimum performance is obtained if several graded lightly loaded status values exist for each trunk group. The ASW searches the ISW(s) for the 2-link route having the lowest load status for the more heavily loaded link which lowest load status does not exceed the highest allowable load status. Among the 2-link routes with the lowest combined load status, the selected route is one that has the lowest total load status sum when the load status of the two individual links is added.

First the ASW checks the total office blocking, the node-to-node blocking, and whether there is a direct trunk group to determine two parameters, L1 and L2, action block 165, with an illustrative set of parameters is shown in Table V. Computation of node-to-node blocking and total office blocking is described below in reference to FIG. 22.

TABLE V

| | MAX-LOAD-STATUS THRESHOLDS | | | |
|---|---|---|---|---|
| Direct | Total Office | Node-to-Node | Thresholds | |
| Trunks | Blocking (%) | Blocking (%) | L1 | L2 |
| Yes | [0,3] | [0,1] | 0 | 0 |
| | | (1,50] | 1.0 | 0 |
| | | (50,100] | 1.0 | 0.5 |
| Yes | (3,10] | [0,15] | 0 | 0 |
| | | (15,50] | 0.7 | 0 |
| | | (50,100] | 0.5 | 0.5 |
| Yes | (10,100] | [0,15] | 0 | 0 |
| | | (15,50] | 0.7 | 0 |
| | | (50,100] | 0.5 | 0 |
| No | All | [0,1] | 1.0 | 0 |
| | | (1,100] | 1.0 | 1.0 |

Test 166 is performed to check whether the current completed calls are less than the parameter L2 multiplied by the offered call load level. If so, the maximum load status is set to reserved (action block 167). If not, test 169 is performed to check whether the current completed calls are less than the parameter L1 multiplied by the offered call load level. If so, then the maximum load status is set to heavily loaded (action block 171); if not, the max load status is set to lightly loaded (action block 173). Otherwise, the maximum load status is set to lightly loaded (action block 173). Action block 175 then searches the ISWs for the least loaded 2-link routes whose load does not exceed the max load status. Among the 2-link routes with the lowest load status, the one route that has the lowest total load status when summed over the 2 links on the route is selected. Test 181 (FIGS. 15) checks whether such as ISW was found. If so, then the next available trunk to that ISW is seized (action block 183) and the call is set up over this trunk (action block 185). Thereafter, traffic counts are updated in the actions of FIGS. 13 starting with action block 143 previously described. If test 181 finds that no ISW was found, this corresponds to failure to find a circuit for this call (action block 187) and the counter of blocked calls to the particular DSW for the particular kind of transmission and service is incremented (action block 189). In test 181, if a plurality of ISWs are found all corresponding to the same lowest max load status, and which also have the same lowest total load status when summed over the two links of the route, then the first ISW beyond a random starting point and searching over all ISWs in a circular fashion is selected.

FIG. 16 describes the actions performed at the ISW. The incoming call is received (action block 201), the received directory number is translated to determine the DSW (action block 203), and the type of transmission for this call is determined (action block 205). Alternatively, the ASW could send the identification of the DSW as part of the IAM message. The identification of the DSW and the type of transmission provides the information needed to select the trunk group (action block 207) and test 209 is used to find if any trunks are available in that group. If so, then the next available trunk in that group is seized (action block 211) and the call to the DSW is set up over this trunk (action block 213). This ends the actions at the ISW (end, action block 215). If no trunks are available in that trunk group then this is treated as a no circuit condition (action block 217) and attempts to route the call further are ended (end, action block 219). The no circuit condition represents a state in which all trunks became unavailable between the time that the message from the DSW was sent to the ASW and the time that the call was forwarded from the ASW to the ISW. This type of situation should be quite rare and indicative of a very high load. As discussed in section 1.14, CRANKBACK is another option and can be used as a alternative to simply considering the call to be blocked at this point.

FIG. 17 shows the action performed at the DSW in response to receipt of a status request message. The DSW receives the status request message from the ASW (action block 231) and builds a status reply from the status of the trunk groups connected to the DSW (action block 233). This status is then sent to the ASW (action block 235) which ends (action block 237) the actions required to respond to a status request message. In addition (not shown), the DSW receives incoming calls and routes them to the destination connected to the DSW using methods well known in the art for completing calls to a destination. This destination may be a local or a tandem switching system or perhaps even a customer directly connected to the DSW.

FIGS. 18-20 show additional actions for updating the trunk group load status as trunks are seized and released. FIG. 18 relates to trunk seizure. FIG. 19 is a comparable flow chart for actions performed when a trunk is released. In both cases it is necessary to update the number of available trunks to or from a particular switch that can handle a particular type of transmission. For example, if a trunk can support both voice and data, then when that trunk is seized or released, the number of available trunks for both voice service and data service must be updated. Similarly, the updated number of available trunks must be reflected in a revised load state for the trunk group, as described in FIG. 20, which is an expansion of action block 259 that is found in both FIGS. 18 and 19. When a trunk is seized or released, a counter or other indicator of different transmission types is initialized to transmission type 1 (action blocks 251 and 271 in FIG. 18 and 19, respectively). A test is made (test 253 and 273 in FIGS. 18 and 19, respectively) of whether the seized or released trunk is equipped to support the transmission type being tested. If so, then the number of available trunks connected to the particular switch offering the particular transmission type is decremented (action block 257, FIG. 18) or incremented (action block 275, FIG. 19) depending on whether the trunk is seized or released, respectively. The load state for this trunk group is then updated as described hereinafter in FIG. 20 being seized or released does not support this transmission type test 261 (FIG. 18) or test 277 (FIG. 19) is performed to check if there are more transmission types. If not, then the updating of the number of available trunks and load state for the appropriate trunk groups has been completed. If so, the transmission type is advanced to the next type (action block 263, FIG. 18) or action block 279, FIG. 19) and the actions beginning with tests 253 (FIG. 18) OR 273 (FIG. 19), respectively, are repeated for this transmission type.

FIG. 20 describes the actions required to update the load state for a trunk group. Test 281 checks whether the number of available trunks for the given connected switch and transmission type is now zero. If so, then the load state for that particular connected switch and transmission type is set to busy (action block 283). If not, then test 285 checks whether the available trunks for the particular connected switch and transmission type is equal to or less than the reserved state threshold for that connected switch and transmission type. If so, then the load state for that connected switch and transmission type is set to reserved (action block 287). If not, then test 289 is used to check whether the number of available trunks to the particular connected switch supporting the particular transmission type is equal type is equal to or less than the reserved state threshold associated with that group plus the heavily loaded state threshold associated with that group. If so, then action block 291 sets the load state to heavily loaded. If not, the load state is set to lightly loaded (action block 293). If there are a plurality of lightly loaded states, then action block 293 is expanded to include a group of tests to check the band of different lightly loaded states and to set the load state to the correct one of these bands.

Figure 26:
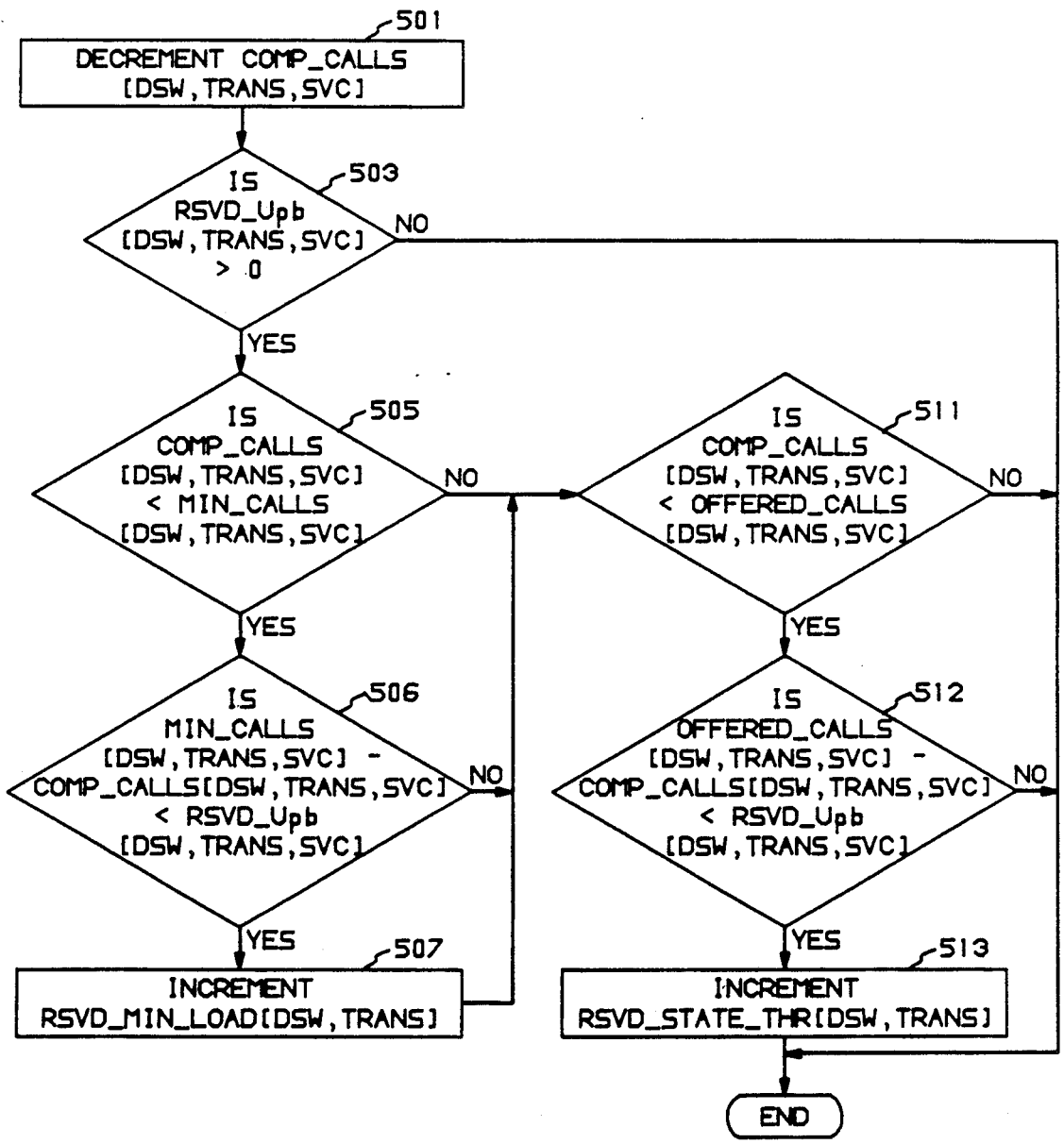

FIG. 26 describes the actions performed at the ASW when a call disconnects. First, the count of completed calls to the DSW for this type of transmission and service is decremented (action block 501). Test 503 then checks whether reservation controls are in effect to this DSW with this type of transmission and service. This check is based on whether the upper bound of the number of trunks reservable for this type of call is greater than zero. If not, no further action is required. If the result of test 503 is positive, then test 505 checks whether the just decremented number of completed calls of this type is less than the minimum desired call load level for this type of call. If so, test 506 checks whether the difference between this minimum desired call load level and the completed number of calls is less than the reserved upper bound limit for this type of call. If so, then the number of available trunks to be reserved in the trunk group to the DSW for this transmission type for services which have not reached their minimum desired call load level is incremented (action block 507). Action block 507 is bypassed if the result of either test 505 or 506 is negative. Next, (test 511) if the number of completed calls to this DSW with this transmission and service type is less than the offered call load level for this type of call, test 512 is performed. Test 512 checks whether the difference between the offered call load level and completed call load level for this type of call is less than the reserved upper bound limit for this type of call. If so, the reserved state threshold for the trunk group to the DSW for this transmission type is incremented (action block 513). Action block 513 is bypassed if the result of either test 511 or 512 is negative.

1.12 Simulation Results

Simulation on the performance of the real-time network routing arrangement as contrasted with dynamic non-hierarchical routing show that the RTNR arrangement blocks less traffic under the same load. For example, in one simulation of a 103 node network loaded to produce 2% blocking using DNHR and a Network management Operation System (NEMOS), the blockage for RTNR using 6 states was under 0.5%. These six states include three graded lightly loaded states, heavily loaded, reserved and busy. Effectively, using three grades of lightly loaded status tends to spread traffic and reduces the number of routes which go into the heavily loaded status. The blockage using RTNR was significantly lower in all cases of low blockage and was lower for traffic that produced high blockage. In particular, the response of RTNR to facility failure was much more rapid in restoring the system to a state wherein the blockage was substantially reduced from the original blockage and showed low blockage throughout the recovery interval. The simulations showed that the traffic handling capacity of the 6 state RTNR appeared to be substantially better than that of an RTNR using a smaller number of states.

1.13 Optimizing Trunk Usage

Figure 22:
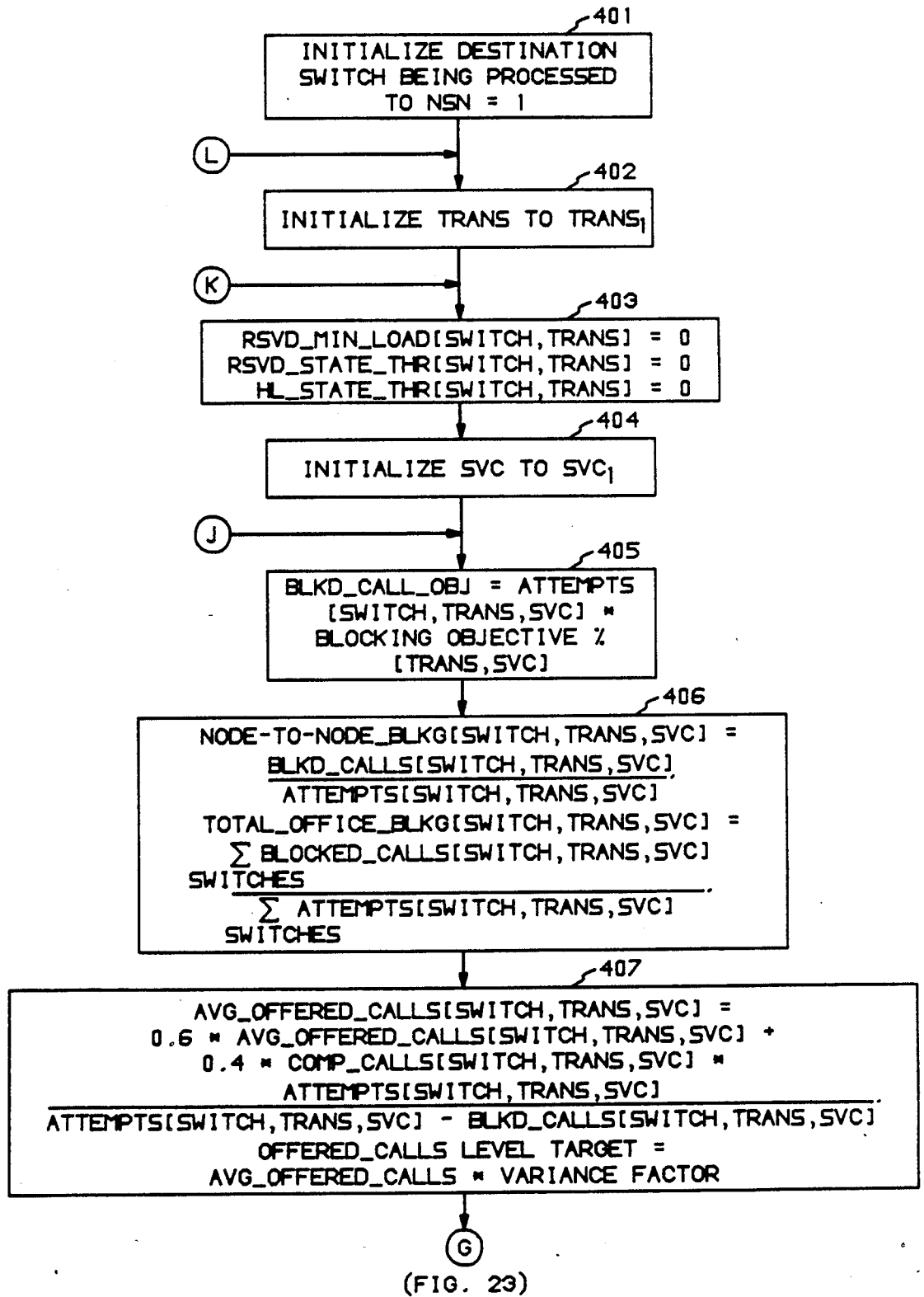
Figure 23:
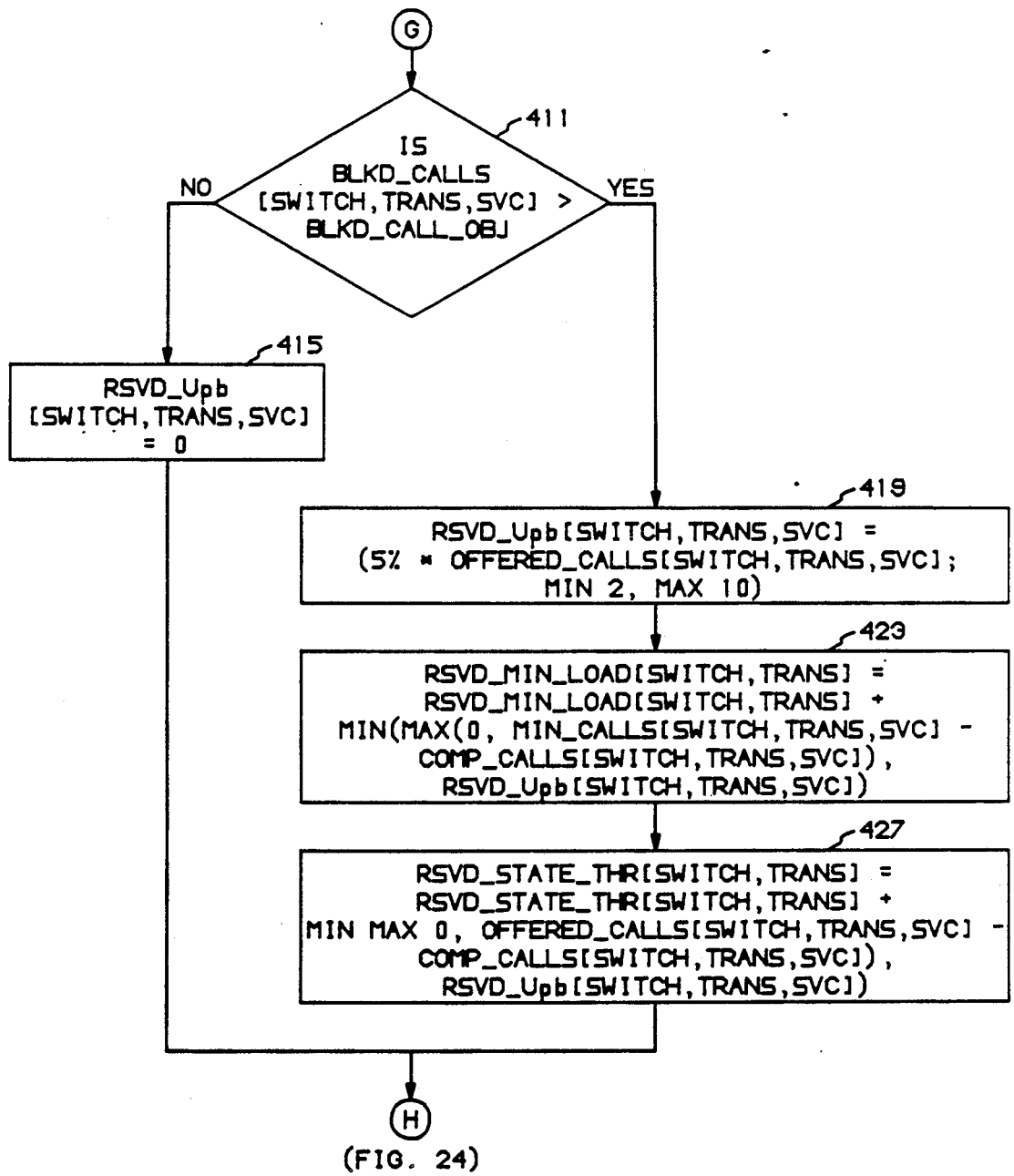
Figure 24:
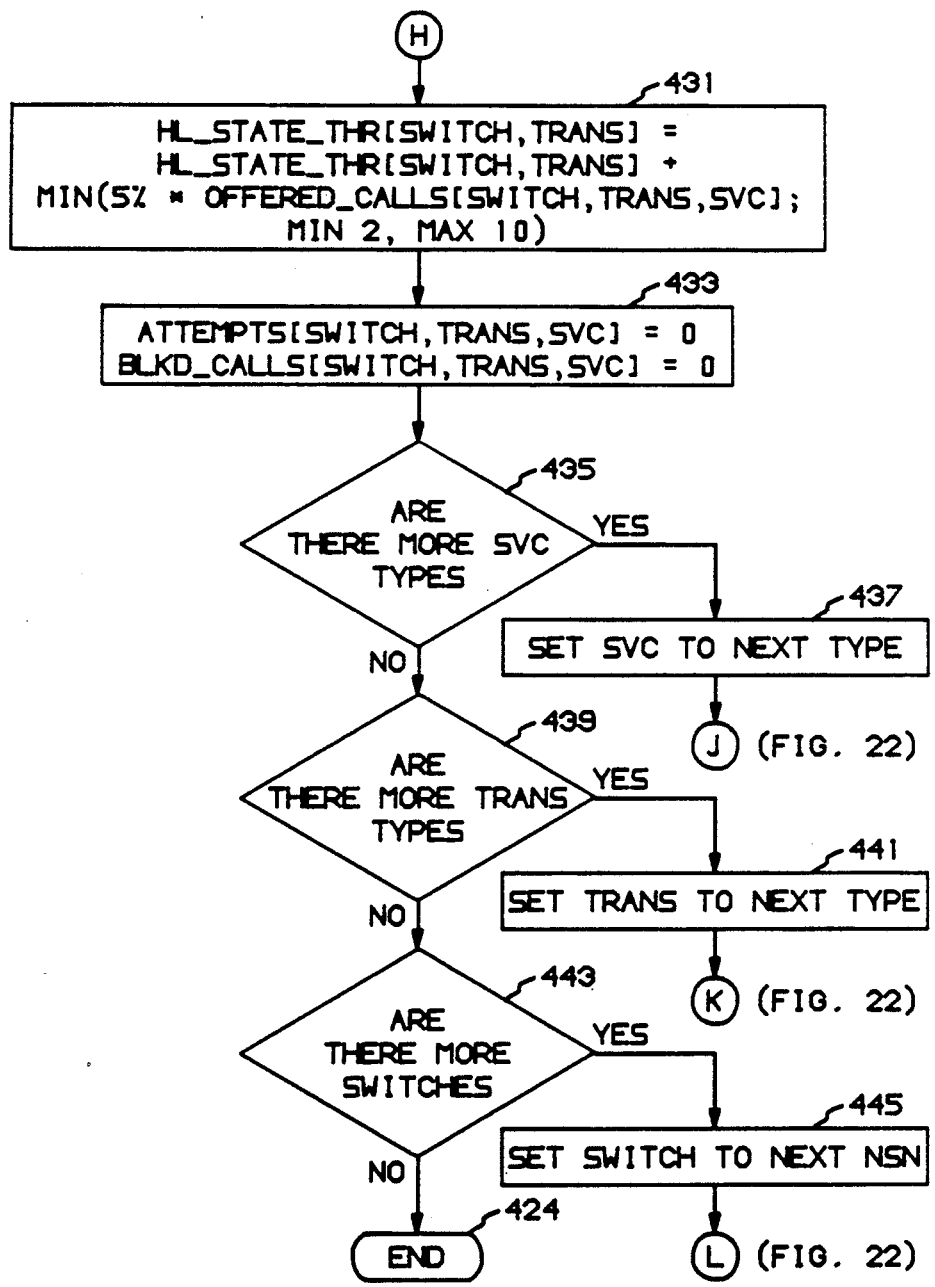

FIGS. 22-24 show the actions that are performed on a periodic basis, e.g., once per minute, to monitor the performance of the integrated multi-service network, and accordingly adjust trunk group load state thresholds and reservation controls to optimize the throughput and performance of the network.

Calls are classified by three parameters, the destination switch for the call, the transmission capability required for the call, e.g., voice, 64 KBPS data, etc., and the service type for the call, e.g., international call, domestic call, etc. At the end of each measurement period, the blocking rate for each set of calls which go to the same destination switch, require the same transmission capability, and have the same service type, is checked. If the grade of service objective is not being met for a set of calls, trunk reservation controls are put into effect; these controls will increase the number of new attempts completed to this switch with this transmission and this service type, and thereby decrease the blocking rate for these new attempts.

Two types of reservation controls are used. The first control is used when the minimum desired level of completed calls to this switch with this transmission and this service type is not being provided. This control reserves available trunks in the direct trunk group to this switch for this transmission capability so that these trunks can be used to complete new call attempts for this particular service type. This control reserves the number of available direct trunks needed to meet the minimum desired call load level for this service; the number of trunks reserved is the difference between this minimum desired call load level and the current number of completed calls to this switch for this service. This procedure controls when available trunks in this trunk group can be used again to complete calls to this switch for services which already have a minimum desired number of completed calls.

The second control is used when the call load being offered to this switch with this transmission and service type is not being completed. This control reserves the number of available direct trunks needed to carry the call load being offered for this service; the number of trunks reserved is the difference between this offered call load level and the current number of completed calls to this switch for this service, with an appropriate upper limit, as specified for example in Table III. This procedure controls when available trunks in this trunk group can be used again in 2-link connections for calls to or from other switches. As such, the number of trunks reserved in a trunk group by this control is the value used for the reserved state threshold for this trunk group.

As shown in FIG. 22, upon being entered at the end of the period, the program is set up to start checking calls to the first switch in the network (action block 401). Each of the transmission capabilities supported to this switch must be checked, so the first transmission type is processed first (action block 402). The reserved and heavily loaded state thresholds for the trunk group to this switch for this transmission type are initialized to zero, as in the number of available trunks in this trunk group to be reserved for services not completing a minimum desired number of calls (action block 403). next, each of the service types defined for this transmission type needs to be checked, so the first service type is processed first (action block 404).

The number of attempts to the selected switch with this transmission and this service type during the period is multiplied by the blocking objective percentage for these calls (action block 405). The product is the number of these attempts which could have been blocked during the period while still meeting the blocking objective.

The node-to-node blocking is determined as the ratio of the blocked calls for the destination switch with this transmission and service type divided by the attempts to the destination switch with this transmission and service type (action block 406). Similarly, the total office blocking is determined as the ratio of the sum of the blocked calls for all the destination switches with the transmission and service type divided by the sum of attempts to all the destination switches with this transmission and service type.

An approximately is then made of the call load to be offered to this switch with this transmission and this service type during the next period. The average offered called load to be offered during the next period is approximated to be the sum of 60% of the average offered call load estimate for the last period plus 40% of the current completed call load to this switch with this transmission and this service type multiplied by a blocking correction factor equal to attempts divided by attempts minus the blocked calls (action block 407). Average offered call load is then multiplied by a variance factor to obtain the offered call load level target. A typical value of the variance factor 1.1.

If the number of blocked call attempts to this switch with this transmission and this service type during this last period is less than or equal to the blocked call objective (test 411, FIG. 23), then no trunks need to be reserved for this service; the upper bound of the number of trunks to reserved for this service is set to zero (action block 415).

If the number of blocked call attempts to this switch with this transmission and this service type during this last period is greater than the blocked call objective (test 411), then trunks may need to be reserved for this service during the upcoming period. The number of trunks to be reserved should be limited to an upper bound, because once a substantial number of available trunks have been reserved, reserving additional trunks as they become available does not improve the performance of the reservation controls. An upper bound for the number of trunks reserved for this service is set, chosen from the smaller of 5% of the number of calls to be offered to this switch with this transmission and this service type limited to a range of two to ten (action block 419).

Next, if the minimum desired number of calls have not been completed to this switch for this service, then the number of available trunks in this trunk group to be reserved for services not completing a minimum desired number of calls is raised to account for this service (action block 423).

If the target number of completed calls being offered to this switch for this service have not been reached, then the reserved state threshold for this trunk group is raised to account for the number of available trunks in this trunk group to be reserved for direct calls to this switch for this service (action block 427).

Now that reservation control actions have been completed, the heavily loaded state threshold to be used for this trunk group during the next period must be adjusted to reflect the offered called load for this service housing this trunk group; the heavily loaded state threshold for this trunk is raised by the smaller of 5% of the offered call load level for this service limited to a range of two to ten (action block 431, FIG. 24). The counters used to accumulate the number of call attempts and blocked calls to this switch with this transmission and this service type during the next period are set to zero (action block 433).

At this point, the actions for this service type have been completed. If there are more service types for this transmission type (test 435), then the service is set to the next type (action block 437) and the system proceeds to check the blocking rate for calls to the same switch using the same transmission type, but for this new service type (action block 405, FIG. 22).

If there are no more service types for this transmission type (action block 435), then the system checks if there are more transmission types supported by the network to this switch (action block 439). If there are more transmission types then the system sets the transmission to the next type (action block 441) and proceeds to check the blocking rate for calls to the same switch for all of the services for this new transmission type (action block 403, FIG. 22).

If there are no more transmission types to check for this switch, then the system checks if there are any more switches in the network (test 443). If there are, the system is set up to check the next switch (action block 445), and proceeds to check all of the transmission types and service types for this switch (action block 402, FIG. 22). If all the switches have been checked, the periodic check for blocking and adjustment of load state thresholds is completed.

1.14 Alternative Arrangement for Using Status Request and Status Response Messages This section describes an alternative arrangement for using status request and status response messages. It addresses the problem in the arrangement described heretofore, a delay for sending a status request message and waiting for the response is incurred every time no direct route is available. The basic arrangement for avoiding this delay is to use the most recently received status response from the destination switch and to make sure that this status response is updated by requesting a new status response. The new status response is then stored for use the next time that a status response from that DSW destination switch is needed. Since the status of the destination switch will sometimes not be up to date, it is necessary to provide for a CRANKBACK procedure since the route picked based on the not up-to-date destination switch status has a greater probability of being, in fact, blocked.

Figure 25:
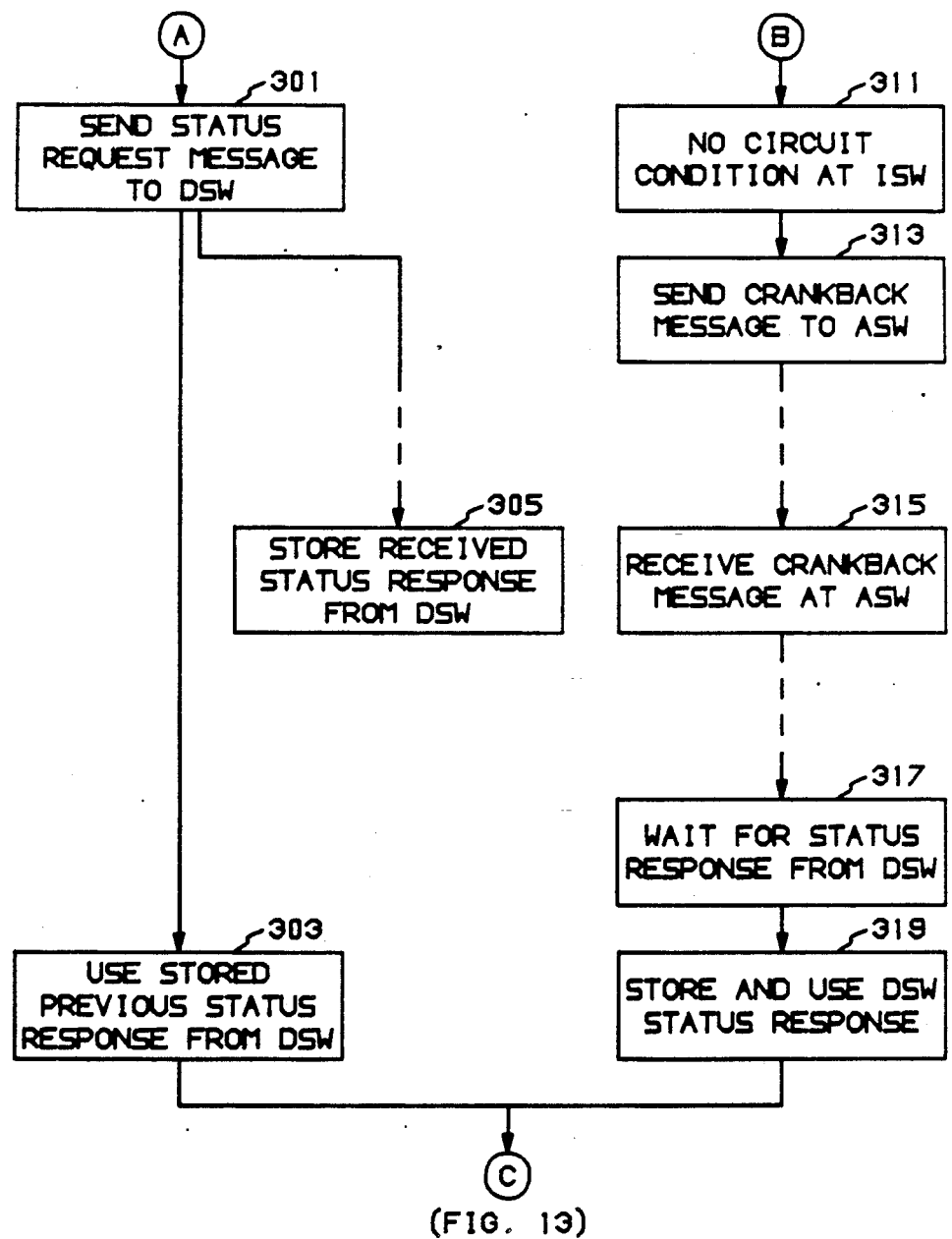

FIG. 25 is normally entered after test 109 (FIG. 11) has determined that there are no available direct trunks. A status request message is sent to the destination switch (action block 301) and when the response is received from the destination switch, this response is stored for future use (action block 305). In the meantime, the stored previous status response from that destination switch is used (action block 303) and the actions previously described with respect to FIG. 14 starting with test 165 are performed. These actions are used to find the appropriate intermediate switch to be used for routing this call.

In case no circuit is available at the intermediate switch, the no circuit condition of action block 217 of FIG. 16, which in the FIG. 16 flow chart led to an end of attempts to route this call. If the alternative approach of FIG. 25 is used, it is recognized that it is necessary to use up-to-date destination switch status information. In that case, action block 217 (FIG. 16) is followed by action block 311 (FIG. 25) which, for the sake of clarity, shows the no circuit condition at the intermediate switch. The intermediate switch sends a CRANKBACK message to the accessing switch (action block 313) which is received at the access switch in action block 315. The access switch waits for the status response from the destination switch (action block 317). This response may already have been received or may not yet have been received since the CRANKBACK message and the status response message are each received after one message round trip time, from the time that the access switch started looking for a route for the call in question. When the status response message from the DSW is received, then that status response is stored and is used for the subsequent search for a route starting with action block 165 of FIG. 14.

Another alternative is to transmit trunk group status information periodically from each switch. Such information can then be broadcast to all switches. The arrangement may be advantageous if good message broadcast facilities are available in the data network interconnecting the switches. With this arrangement, all switches periodically broadcast their trunk group status to all other switches, and as request messages are required. The most recently received trunk group status data replaces any older version and is directly used by the ASW. A CRANKBACK procedure, described supra, is advisable since the status information is not quite as current as it is if requested by the ASW in response to a call setup request.

1.15 Network Management Using RTNR

There are three types of network management controls, code group controls, expansive routing controls, and restrictive routing controls.

Code group controls are used when the traffic load to a called number, or a set of numbers, is not being completed at or near the expected rate either because of unusual peaks or equipment failure. Code group controls are used to cut back attempts to the affected codes so that network resources are not excessively tied up for calls that have a poor probability of completing. These controls are independent of network routing strategies, and are unchanged by the use of RTNR. The ASW filters out at least some of the requests for connections to the affected code groups and does not even try to route these calls; unfiltered requests are routed in the normal fashion.

Expansive routing controls are used to increase the number of alternate routes from an ASW to an DSW by specifying additional alternate routes to those already contained in an engineered routing list. Network managers determine which potential routes in the network are carrying less than their engineered loads, and therefore can be used as alternate routes to handle some traffic peaks. RTNR does not use engineered routing lists; in fact, RTNR automatically checks every possible route through the network for each call, and uses the lightest loaded route available. As such, expansive routing controls have been integrated into call routing.

Restrictive routing controls can be used, if necessary, to handle general traffic loads which are focused on a particular switch, i.e., the load is not focused on a code groups or a limited set of code groups. Restrictive routing controls also are intended to cut back the number of attempts directed to this switch, so that network resources are not excessively tied up completing calls to this switch, and thereby spread congestion to other switches in the network. RTNR gives network managers a readily usable framework for the specification of restrictive routing controls. Alternate routing can be restricted on the basis of the load status of the routes. For a moderate overload, only alternate routes that are very lightly loaded, or lightly loaded can be used. For a more extreme call overload, only very lightly loaded routes can be used. Again, these actions are more closely integrated with call routing. Network managers specify an override routing pattern to use for attempts to the switch under overload, and routing is automatically adjusted to this override pattern. However, it may not be necessary to provide restrictive routing controls; field experience and further simulations are necessary to check more definitely to see whether restrictive routing controls will still be required in a particular network.

1.16 General

While in this embodiment, the ASW selects the route, it is also possible for the DSW to receive ASW trunk group status and to select the route based on that data and the DSW's own status data.

While this embodiment relates to circuit connections, the principles of this invention can also be applied to packetized data connections. When setting up a packet data channel, the same method for selecting a route can be used in order to load traffic onto the more lightly loaded trunk groups or data circuits.

1.17 Trunk Reservation Arrangements

The following remaining portion of the detailed description relates to arrangement for reserving trunks in a first choice group for particular types of traffic.

The algorithm for deciding whether an available trunk may be seized under particular circumstances of actual load can best be understood in terms of the following equations:

Let $traf_1, \ldots, traf_k$ = key traffic types which use a particular trunk group as the first choice route to a destination.

Let $traf_{k+1}, \ldots, traf_n$ = standard traffic types which use a particular trunk group as the first choice route to a destination.

Let $A_i$ = Actual load being carried for $traf_i$ (1)

Let $O_i$ = Objective for $traf_i$ (2)

Let $L_i$ = Reserve limit for $traf_i$ (3)

Let $R_i$ = Number of trunks reserved for additional service for $traf_i$ (4)
$= Max[0, Min[(O_i - A_i), L_i]]$ $T_K = \sum_{i=1}^{k} R_i =$ Key reserve sum for this particular group (5)

$T_T = \sum_{i=1}^{n} R_i =$ Total reserve sum for this particular group (6)

$M$ = Number of available trunks in the group (7)

For the traffic types which use this group as their first choice route:

If $i \leq k$ and $A_i < O_i$, seize a trunk if $M > 0$ (8)

If $i > k$ and $A_i < O_i$, seize a trunk if $M > T_K$ (9)

If $A_i \geq O_i$, seize a trunk if $M > T_T$ (10)

For the traffic types which use this group as an alternate route:

Seize a trunk if $M > T_T$ (11)

The total number of traffic types is n, of which k are key traffic types and n−k are standard traffic types (if there are no key traffic types, i.e., k=0, then the standard traffic types are $load_1, \ldots, load_n$). For the key traffic types, special attempts are made to offer service up to the load objective. $Traf_{(k+1)}, \ldots, traf\ n$ are standard traffic types which are not so protected. $A_i$ is the actual load being carried for the traffic type $traf_i$. $O_i$ is the load objective for $traf_i$. $L_i$ is the reserve limit for $traf_i$. $R_i$ is the number of trunks reserved in the group for additional service for $traf_i$. $R_i$ is a minimum of 0 as indicated by one of the terms of the max expression, and, if not 0, then the minimum of the two terms $L_i$ and $(O_i - A_1)$. In other words, $R_i$ is a non-negative number which represents a positive difference between $O_i$ and $A_i$ up to a limit $L_i$. $T_K$ is the key reserve sum and is the sum of $R_i$'s for the first k services. $T_T$ is the total reserve sum and it is the sums of the $R_i$'s of all n types of service.

With these definitions, the following algorithms are used to decide whether a trunk may be seized in a group. For first choice routes for key services ($i \leq k$) and $A_i$ is less that $O_i$, seize a trunk if M (the number of available trunks in the group) is greater than 0. In other words, if the actual load being carried for a key service is less than the objective load, seize any available trunk in the first choice route. Next, if i>k, i.e., (if this is a standard service) and $A_i$ is less than $O_i$ (the actual load is less than the objective load), seize a trunk if $M > T_K$ i.e., if the number of available trunks is more than the key reserve sum). In other words, if the actual load is less than the objective load, seize a trunk as long as the number of trunks available is greater than the reserve sum for the key services. Finally, if $A_i$ is equal to or greater than $O_i$, that is, if the present actual load is equal to or greater than the objective load for that service, seize a trunk if $M > T_T$. In other words if the actual load equals or exceeds the objective load (and if the two are currently equal and an additional trunk is seized, then following the seizure, the actual load will exceed the objective load) then a trunk should be seized only if the number of available trunks exceeds the total reserve sum for all services. In other words, for both standard and key services, if the actual load exceeds the load objective, then a trunk should only be seized if enough idle trunks would remain to serve the sum of the reserve trunk required for all the services which are currently below that objective.

Table VI is an example to illustrate the principles of this invention. Four types of services are offered. Services 1 and 2 are key services and services 3 and 4 are standard services. The load objectives for each of the four services are 10, 5, 20, and 30, respectively. The reserve limit for each of these services are 6, 5, 10, and 10, respectively. Note, for example, that for service 4 which has a load objective 30, the reserve limit is 10; the reserve limit is a number designed to handle surges of traffic and in engineering this system, it was felt that to be prepared to handle a surge of 10 even for this standard service with load objective of 30 should give adequate protection to that service.

TABLE VI

| Service | $O_i$ | $L_i$ | $A_i$ | $R_i$ |
|---|---|---|---|---|
| 1 | 10 | 6 | 9 | 1 |
| 2 | 5 | 5 | 5 | 0 |
| 3 | 20 | 10 | 18 | 2 |
| 4 | 30 | 10 | 15 | 10 |

At a particular time, the actual load in the system is 9 units for service 1, 5 units for service 2, 18 units for service 3, and 15 units for service 4. The number of trunks reserved for additional service for each of these four services is then 1, 0, and 2 for the first three services, in this case representing a positive or zero difference between the objective and the actual load being carried, and is 10 for service 4, since this number is limited to the reserve limit for that service. Under these circumstances, $T_K$, the key reserve sum is 1 representing the sum of the reserves for services 1 and 2, and $T_T$, the total reserve sum is 13, the sum of the reserve quantities for all of the services. Under these circumstances, if M, the total number of available trunks, is 0, then no trunks are available regardless of which type of service is being sought. If the total number of available trunks is 1, then only service type 1 will be able to seize that last available trunk because it is the only service which is both key and for which the actual load is below the load objective; i.e., since $M \leq T_K$, and since service 1 is the only key service below load objective, it is the only service which can use the available trunk. IF M is between 2 and 13, then service types 1, 3, and 4, all of which are below objective, will be able to seize an available trunk, since $M \leq T_T$. Finally, if M is greater than 13, ($T_T$) then service 2, which is already at objective load, will also be able to seize a trunk because at least 13 trunks $T_T$ will remain available for the use by the other three services.

In an alternative embodiment $L_i$ is a function of node to node blockage as described with respect to Table III. Using this approach, $L_i$ is increased for a trunk group having high blockage, and can be 0 for low blockage. In networks where extensive alternate routing is available, it is advantageous to use arrangements wherein $L_i$ is calculated as discussed with respect to Table III; where alternate routes are less extensive, the approach described above with respect to Table VI is preferable.

Figure 28:
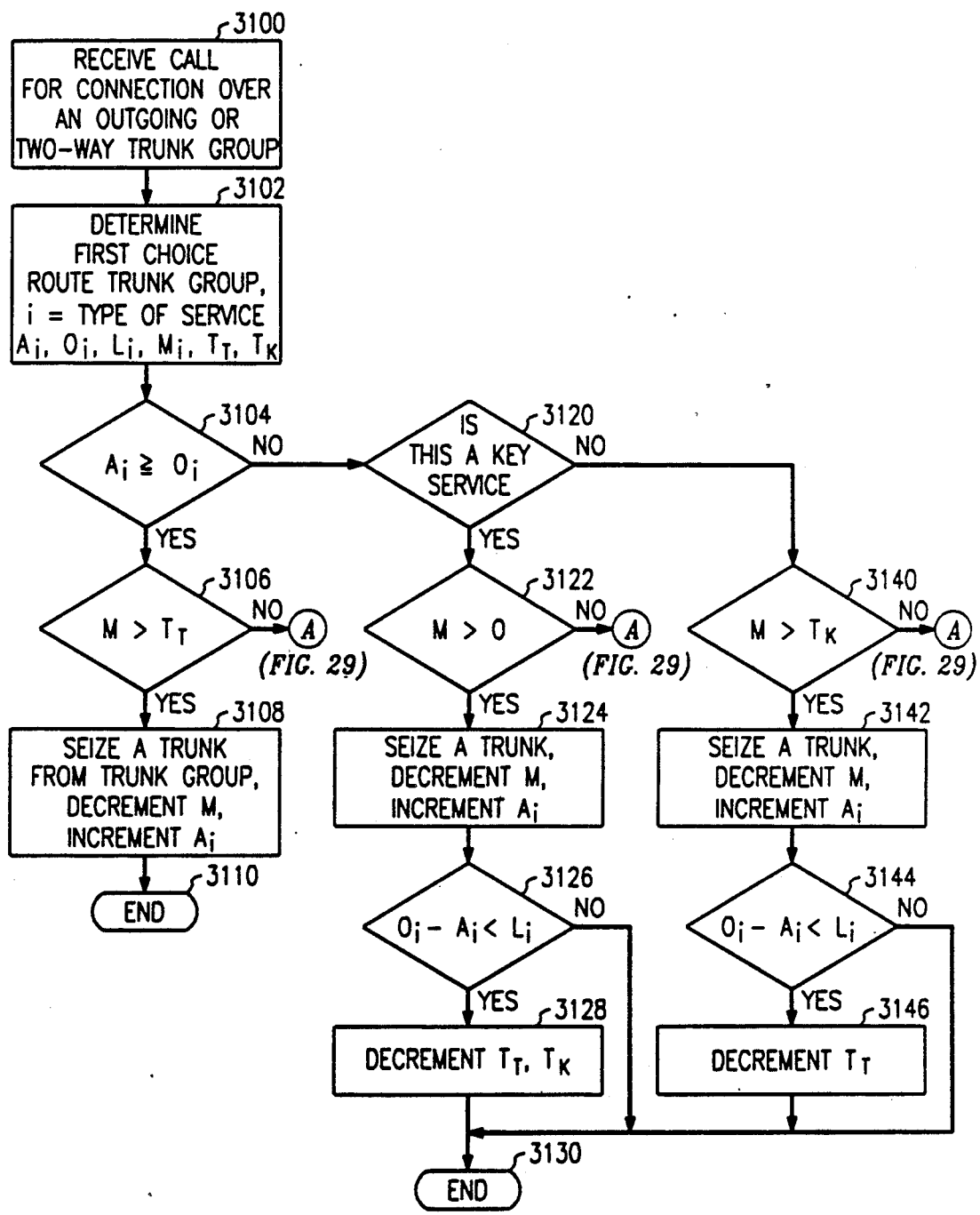
FIGS. 28–30 are flow diagrams of actions performed by a switching system control processor to seize a trunk from an appropriate group and to update reserve parameters for that group.

FIG. 28 illustrates the process of this invention. A call for connection via an outgoing or two-way trunk group is received (action block 3100) at switching system 3200. The first choice trunk group for this call is determined as is i, the type of service for this call within this trunk group. Then the parameters for that type of service, namely $A_i$, the actual present load, $O_i$, the objective load for that service, $L_i$, the reserve limit for that service are determined, as are the parameters of the trunk group, namely, M, the number of available trunks, $T_T$ the total reserve parameter, and $T_K$ the key services reserve parameter (action block 3102). Next, the actual load is compared with the objective load for that service (test 3104). If the actual load equals or exceeds the objective (remembering that the actual load as recorded is the load without the additional call), then test 3106 is used to determine whether the number of idle trunks M exceeds the total reserve $T_T$. If not, then test 3160, to be described below, is used to check if there are additional alternate trunk groups. If the number of available trunks M exceeds the total reserve parameter $T_T$, then a trunk is seized from the trunk group, the number of idle trunks M is decremented and the load for the particular service $A_i$ is incremented (action block 3108). This ends the process of selecting a trunk for carrying the call (action block 3110).

If the actual load is less than the objective as determined in test 3104, then test 3120 is used to determine whether this is a key service. If this is a key service, test 3122 simply checks whether there are any available trunks, i.e., whether M is greater than 0. If so, then a trunk is seized, M is decremented, and $A_i$ the load for that kind of service is incremented (action block 3124). Next, test 3126 checks whether the difference between the objective load and the updated actual load is less than the reserve limit $L_i$. If so, then both the total reserve $T_T$ and key reserve $T_K$ are decremented (action block 3128) and the process of selecting a trunk for the incoming call is completed (end block 3130). If the difference between the objective load for the service and the actual load for the service is still greater than or equal to the reserve limit, there is no need to modify the $T_T$ and $T_K$ parameters. In another sequence (not shown), the $T_T$, and $T_K$ parameters are periodically audited to make sure that they agree with the sum of all positive differences between objective and actual loads for the key and for all services, respectively, each term of that sum being subject to the reserve limit parameter for that term (see equations (4), (5), and (6)).

If this is not the key service as determined in test 3120, then test 3140 determines whether the number of available trunks exceeds the key reserve parameter. If not, then no trunks are to be seized from this trunk group and an alternate trunk group is to be examined starting with test 3160 to be described below. If the number of available trunks exceeds the reserve parameter for key services, then a trunk is seized from the group, M, the number of available trunks, is decremented, and $A_i$, the actual load for the service is incremented (action block 3142). In test 3144 a check is made whether the difference between the objective load and the actual load as updated is less than the reserve limit for this kind of service. If so, then the total reserve parameter $T_T$ is decremented (action block 3146) and the process of selecting a trunk for the incoming call has been completed (end block 3130). If the difference between the objective and the actual load is still greater than or equal to the reserve limit, then $T_T$ is not decremented.

Test 3160 (FIG. 29), which is entered initially because no trunks are available for the incoming call in the first choice trunk group, checks whether there are additional alternate trunk groups for the destination of the incoming call. If not, then the NO CIRCUITS AVAILABLE condition is recognized (action block 3162) and the call cannot be completed. Under these circumstances, the calling customer on the incoming call is normally given overflow tone or some type of ALL CIRCUITS BUSY announcement. If the result of test 3160 is positive that there are additional alternate trunk groups available, then action block 3164 finds the next alternate trunk group and determines the number of available trunks M and the total reserve parameter $T_T$ for that trunk group. If M exceeds $T_T$ (test 3166), then a trunk is seized from that group, M the number of available trunks for that group is decremented and $A_i$ is incremented (action block 3168). Note that the reserve parameters are not changed when a trunk from an alternate group is used. This completes the process of seizing a trunk for handling the incoming call (end block 3170). If the result of test 3166 indicates that the available number of trunks is less than or equal to the total reserve parameter $T_T$, then test 3160 is re-entered to search for an additional alternate trunk group.

Figure 29:
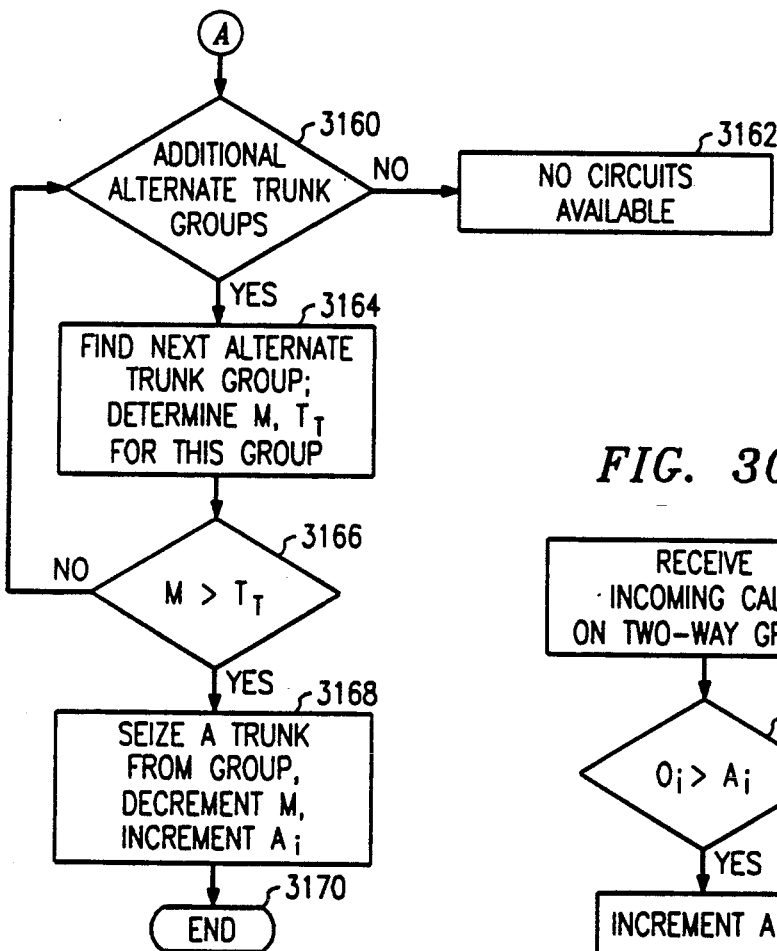

While in this embodiment, only standard and key services are used, it is straightforward to expand the concept to several grades of services and to a series of cumulative reserve services, instead of just two. The principles used are the same, except that a different reserve sum is used for each grade of service in tests 3122 and 3140 and their intermediate equivalents. FIG. 29 is unchanged.

Figure 30:
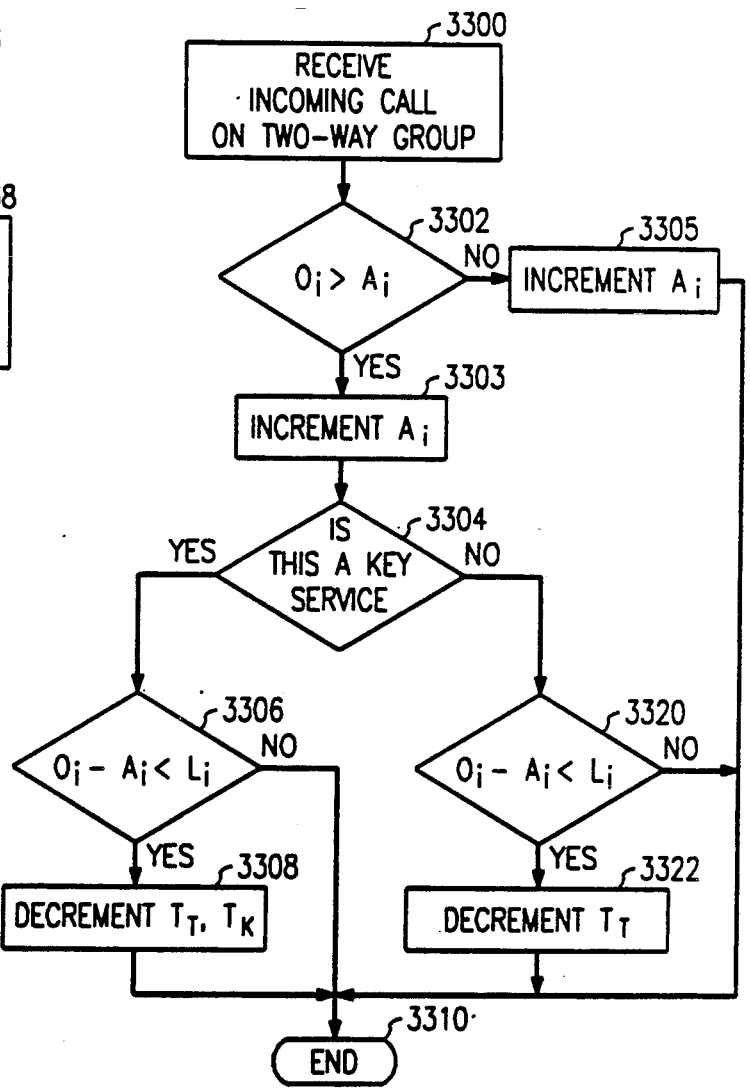

FIG. 30 is a flow chart of the actions performed in response to an incoming call on a two-way trunk group. Incoming calls for the two-way trunk group also have objective loads and actual loads for different kinds of services and have a reserve limit. When such an incoming call is received on a two-way trunk group (action block 3300), a test is made whether the objective load is equal to or greater than the actual load for incoming calls for this kind of service (test 3302). If not, $A_i$ is incremented (action block 3305) but no actions are required to update the reserve limits $T_T$ and $T_K$ and the actions with respect to these reserve limits are completed (end block 3310). If the objective load is greater than the actual load, $A_i$ is incremented (action block 3303) and then test 3304 is used to determine if this is a key service. If so, then test 3306 is used to determine whether the objective load minus the actual load is less than the reserve limit for that service. If so, then the two reserve parameters $T_T$ and $T_K$ are both decremented. If not, neither of the total reserve parameters are decremented. This completes the actions of updating the total reserve parameters for this call under these circumstances (end block 3310). If the result of test 3304 indicates that this is not a key service, then test 3320 is used to determine whether the difference between the objective load and the actual load for this service is less than the reserve limit for this service. If so, then the total reserve parameter is decremented (action block 3322). If the total reserve parameter is not decremented, this completes the actions for modifying the reserve parameters in response to the receipt of the incoming call on the two-way trunk group (end block 3310).

Figure 31:
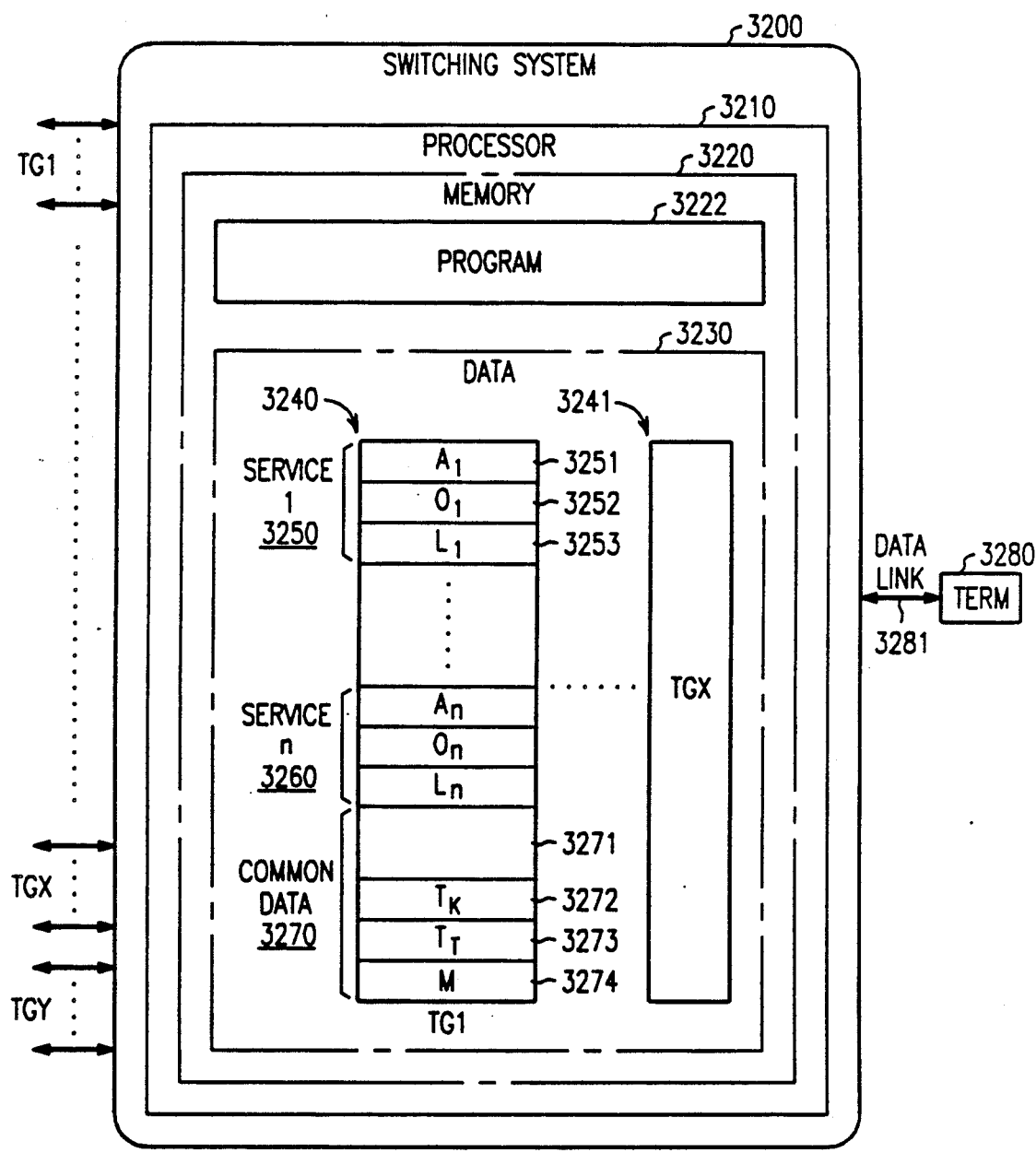
FIG. 31 is a diagram showing a switching system, its processor and the layout of memory for storing data to control the selection of available trunks in accordance with the principles of this invention.

FIG. 31 is a block diagram of a switching system for implementing this invention. The switching system has a plurality of outgoing or two-way trunk groups, TG1, . . . , TGX connected as well as one or more groups of incoming trunks such as trunk group TGY. The process described in FIGS. 28 and 29 is used only with respect to the outgoing or two-way trunk groups. Switching system 3200 is controlled by processor means 3210 comprising memory 3220 that includes a program 3222 for executing the steps of the process of FIGS. 28 and 29 and data 3230 for storing data for each of the trunk groups such as block 3240 for trunk group 1 and block 3241 for trunk group X. Block 3240 comprises a plurality of n blocks such as block 3250 for storing parameters associated with the first service and block 3260 associated for storing blocks associated with the nth service. Block 3250 comprises storage for $A_1$ the actual load for service type 1, $O_1$ the objective load for the objective load for service 1 and $L_1$ the reserve limit for the first service. In addition block 3240 contains common area 3270 which includes the identifications and availability of the trunks in the trunk group 3272, the key services parameter $T_K$, 3273 the total reserve parameter, $T_T$, and M the number of available trunks stored in block 3274.

FIG. 30 also shows a control terminal 3280 for an administrator to transmit requests for changes to the stored parameters, such as O and L for a particular trunk group, over data link 3281. The terminal can be for a common carrier network administrator for common carrier trunk groups, or from a customer network administrator for a trunk group connecting switching system 3200 to the customer's PBX. The requested changes are examined by the processor 3210 and inserted in the data block 3240, . . . , 3241 for the approximate trunk group. If the PBX is connected by an Integrated Services Digital Network (ISDN) connection, the data link can be a D-channel of the ISDN connection. The data link need not be a data link dedicated for this purpose but can be a virtual data channel over a facility for transmitting data or data and voice.

Not that for the arrangement of this invention, the number of trunks in the trunk group is not tied to the sums of the objective loads. Thus, if it is recognized that there is a non-coincidence of busy hours between two different types of services, for example 800 (for phone) service and conventional message service, then the sums of the load objectives for the different services can exceed the number of available trunks. Note further that in case of equipment failures wherein a substantial number of trunks suddenly become unavailable, the arrangements described protect the load objectives of the key services, which might include emergency services or services that are especially profitable for the operators of the telecommunications network. Further, there is protection against the effects of excessive surges in one kind of service because of the two reserve parameters. By selecting the reserve limit properly, it is possible to accommodate surges in one type of traffic while still maintaining a substantial margin for increases in other kinds of traffic that are well below their objective loads. Note further, that the cost of creating an additional type of service is much less since a new trunk group need not be set aside for this service; by proper selection of the reserve limit for that kind of service, the peaks of other services can continue to be accommodated.

While in this embodiment, reserves are only used for first choice routes (which can include indirect as well as direct routes), in other embodiments, the reserve content can also be for alternate routes.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a telecommunication network comprising a plurality of switching systems, a method of determining a route for a call between any first and any second system of said network via one of a plurality of third systems of said network comprising the steps of:
- assembling in said first system first present availability data of communication paths between said first system and ones of said third systems;
- assembling in said second system second present availability data of communication paths between said second system and ones of said third systems;
- transmitting said second availability data from said second system to said first system; and
- determining a route in said first system between said first and said second systems via one of said third systems based on said first and said second availability data.

2. In a first telecommunications switching system, a method of determining a route between said first telecommunications switching system and a second telecommunications switching system over a telecommunications network comprising a plurality of third telecommunications switching systems, comprising the steps of:
- assembling in said first system first present availability data of communication paths between said first system and ones of said third systems;
- receiving in said first system from said second system second present availability data of communication paths between said second system and ones of said third systems; and
- determining a route in said first system between said first and said second systems via one of said third systems based on said first and said second availability data.

3. The method of claims 1 or 2 wherein said first system receives said call for routing to said second system.

4. The method of claim 3 further comprising the steps of:
- before executing said determining step, testing whether a direct communication path between the first and the second system is available; and
- if the testing step indicates that no direct communication path is available, executing the determining step; and
- if the testing step indicates that a direct communication path is available, determining that the call is to be routed over the direct communication path.

5. The method of claim 2 further comprising the step of:
- transmitting said second availability data from said second system to said first system.

6. The method of claims 1 or 5 wherein said step of transmitting second availability data comprises the step of transmitting said second availability data over a data network.

7. The method of claim 6 comprising the step of transmitting said second availability data periodically.

8. The method of claim 6 wherein said transmitting second availability data comprises the step of transmitting second availability data over a common channel signaling network.

9. The method of claim 6 wherein said step of transmitting second availability data comprises the step of transmitting said second availability data responsive to a request for said second availability data from said first system.

10. The method of claim 9 wherein said determining step is made responsive to availability data received in response to a previous request from said first system.

11. The method of claim 10 wherein said determining step comprises the step of requesting updated availability data from said second system for use in a subsequent determining step for a call between said first system and said second system.

12. In a telecommunication network comprising a first and a second switching system and a plurality of third switching systems, a method of determining a route for a call between the first and second systems comprising the steps of:
- assembling first availability data of communication paths between said first system and ones of said third systems;
- assembling second availability data of communication paths between said second system and ones of said third systems;
- transmitting said second availability data from said second system to said first system; and
- determining a route between said first and said second systems via one of said third systems based on said first and said second availability data;
- wherein said availability data comprises data indicating one of a plurality of grades of availability, including lightly loaded and heavily loaded grades of availability for communication path groups and wherein said determining step comprises the step of:
- selecting a route via a third system having lightly loaded communication path groups between said third system and said first and second systems; and
- if no routes are available via a third system having lightly loaded communication path groups between said third system and said first and second systems, selecting a route via a selected third system having heavily loaded communication path groups in at least one of the groups between said selected third system and said first and second systems.

13. In a first telecommunications switching system, a method of determining a route between said first telecommunications switching system and a second telecommunications switching system over a telecommunications network comprising a plurality of third telecommunications switching systems, comprising the steps of:
- assembling first availability data of communication paths between said first system and ones of said third systems;
- receiving second availability data of communication paths between said second system and ones of said third systems; and
- determining a route between said first and said second systems via one of said third systems based on said first and said second availability data;
- wherein said availability data comprises data indicating one of a plurality of grades of availability, including lightly loaded and heavily loaded grades of availability for communication path groups and wherein said determining step comprises the step of:
- selecting a route via a third system having lightly loaded communication path groups between said third system and said first and second systems; and
- if no routes are available via a third system having lightly loaded communication path groups between said third system and said first and second systems, selecting a route via a selected third system having heavily loaded communication path groups in at least one of the groups between said selected third system and said first and second systems.

14. The method of claim 12 or 13 wherein said lightly loaded grade comprises a subgrade for very lightly loaded groups and a subgrade for moderately lightly groups, wherein said very lightly loaded groups have a higher percentage of available communication paths than said moderately lightly loaded groups, and said step of selecting a route via a third system having lightly loaded groups comprises the step of:

selecting a route via a third system having very lightly loaded communication path groups between that third system and said first and second systems in preference to a route via a third system in which at least one of the groups between that system and said first and second systems is moderately lightly loaded.

15. The method of claim 12 or 13 wherein said step of selecting a route via a selected third system only having heavily loaded communication path groups in at least one of the groups comprises the step of selecting a route only if blocking between said first and said second systems is more than a predetermined threshold.

16. The method of claim 12 or 13 wherein routes between switching systems comprise routes for transmitting different services requiring different transmission requirements, said routes having communication paths capable of transmitting for a plurality of different transmission requirements, wherein data for grades of availability are maintained for each transmission type, and wherein said determining step comprises the step of:

determining availability data of communication paths capable of offering a requested transmission service.

17. The method of claim 12 or 13 wherein said first system further stores a list of third systems through which calls between said first and second systems are allowed to be routed, wherein the determining step comprises the step of:

determining a route between said first and said systems via one of said third systems comprised in said list of third systems.

18. In a first telecommunications switching system, a method of determining a route between said first telecommunications switching system and a second telecommunications switching system over a telecommunications network comprising a plurality of third telecommunications switching systems, comprising the steps of:

testing whether a direct communication path between the first and the second system is available;

if the testing step indicates that a direct communication path is available, routing the call over the direct communication path;

if the testing step indicates that no direct communication path is available, assembling first availability data of communication paths between said first system and ones of said third systems;

transmitting a request for second availability data, of communication paths between said second system and ones of said third systems, to said second system;

receiving, over a common channel signaling network, said second availability data;

determining, in said first system, a route between said first and said second systems via one of said third systems based on said first and said second availability data;

wherein said first and said second availability data comprise data indicating one of a plurality of grades of availability, including very lightly loaded, moderately lightly loaded, heavily loaded, and reserved grades of availability for communication path groups;

wherein said determining step comprises the step of:

selecting a route via a third system having very lightly loaded or moderately lightly loaded communication path groups between said third system and said first and second systems including selecting a route via a third system having very lightly loaded communication path groups between that third system and said first and second systems in preference to a route via a third system in which at least one of the groups between that system and said first and second systems is moderately lighly loaded; and if no routes are available via a third system having very lightly loaded or moderately lightly loaded communication path groups between said third system and said first and second systems, and if blocking between said first and said second systems is more than a predetermined threshold, selecting a route via a selected third system having heavily loaded communication path groups in at least one of the groups between said selected third system and said first and second systems;

wherein said reserved grade comprises communication path groups with paths available for calls, using two links, for use in said determining step only if no other routes have available communication paths and if there are no direct communication paths between said first and said second system and if a high blocking rate between the first system and the second system has been encountered;

wherein a plurality of types of services are provided over a communication path group, and wherein the reserved grade of service is assignable to a subset, comprising services experiencing a high blocking rate between said first and said second system or having fewer than a minimum desired number of calls completed, of said plurality of types of service;

wherein routes between switching systems comprise routes for transmitting different services requiring different transmission requirements, said routes having communication paths capable of transmitting for a plurality of different transmission requirements, wherein data for grades of availability are maintained for each transmission type, and wherein said determining step comprises the step of determining availability data of communication paths capable of offering a requested transmission service;

wherein said first system further stores a list of third systems through which calls between said first and second systems are allowed to be routed, wherein the determining step comprises the step of determining a route between said first and said systems via one of said third systems comprised in said list of third systems.

19. In a first telecommunications switching system, apparatus for determining a route through a telecommunications network comprising:

control means, comprising storage for a plurality of tables and a program, responsive to data stored in said plurality of tables, and operable under the control of said program for:

responsive to an incoming call to said first system and to data stored in a translation table of said control means, determining that said call should be routed to a second switching system;

assembling first availability data of first communication paths between said first system and ones of third switching systems connected to said first system by said first communication paths;

receiving second availability data of communication paths and ones of said third systems;

determining a route between said first and said second systems via one of said third systems based on said first and said second availability data;

wherein said availability data specifies which of a plurality of bands, ranging from lightly loaded to heavily loaded to blocked, pertain to the availability of communication paths between a third system and said first or said second system, and wherein said determining comprises determining a route via a third system having communication path groups to said first and said second systems, the more heavily loaded of said groups to said first and said second systems having the least heavily loaded band of communication path availability.

20. The apparatus of claim 19 wherein said plurality of grades comprises a reserved grade comprising communication path groups with paths available for calls, using two links, only if no other routes have available circuits and if a high blocking rate between the first system and the second system has been encountered.

21. The apparatus of claim 19 wherein said plurality of grades comprises a reserved grade comprising communication path groups with paths available for calls using two links only if no other routes have available paths in groups not in the reserved grade load status and if there is no direct route between the first system and the second system.

22. The apparatus of claim 19 wherein a plurality of types of service are provided over a communication path group, wherein said plurality of grades comprises a reserves grade, and wherein the reserved grade of service is assignable to a subset of said plurality of types of service.

23. The apparatus of claim 22 wherein said subset comprises services experiencing a high blocking rate between said first and said second system.

24. The apparatus of claim 22 wherein said subset comprises services having fewer than a minimum desired number of calls completed.

25. In a first telecommunications switching system, apparatus for determining a route through a telecommunications network comprising:

control means, comprising storage for a plurality of tables and a program, responsive to data stored in said plurality of tables, and operable under the control of said program for:

responsive to an incoming call to said first system and to data stored in a translation table of said control means, determining that said call should be routed to a second switching system;

assembling first availability data of first communication paths between said first system and ones of third switching systems connected to said first system by said first communication paths;

receiving second availability data of communication paths and ones of said third systems; and determining a route between said first and said second systems via one of said third systems based on said first and said second availability data;

wherein said availability data comprises data indicating one of a plurality of grades of availability, including lightly loaded and heavily loaded grades of availability for communication path groups and wherein said determining a route comprises:

selecting a route via a third system having lightly loaded communication path groups between said third system and said first and second systems; and if no routes are available via a third system having lightly loaded communication path groups between said third system and said first and second systems, selecting a route via a selected third system having heavily loaded communication path groups in at least one of the groups between said selected third system and said first and second systems.

26. The apparatus of claim 25 wherein selecting a route via a selected third system only having heavily loaded communication path groups in at least one of the groups comprises selecting a route only if blocking between said first and said second systems is more than a predetermined threshold.

27. The apparatus of claim 25 wherein said lightly loaded grade comprises a subgrade for very lightly loaded groups and a subgrade for moderately lightly loaded groups, wherein said very lightly loaded groups have a higher percentage of available communication paths than said moderately lightly loaded groups, and wherein selecting a route via a third system having lightly loaded groups comprises:

selecting a route via a third system having very lightly loaded communication path groups between that third system and said first and second systems in preference to a route via a third system in which at least one of the groups between that system and said first and second systems is moderately lightly loaded.

28. The apparatus of claim 25 wherein routes between switching systems comprise routes for transmitting different services requiring different transmission requirements, said routes having a communication path capable of transmitting for a plurality of different transmission requirements, wherein data for grades of availability are maintained for each transmission type, and wherein said determining comprises determining availability data of communication paths capable of offering a requested transmission service.

29. The apparatus of claim 25 wherein said control means further comprises storage for a list of third systems through which calls between said first and second systems are allowed to be routed, wherein said determining step comprises:

determining a route between said first and said second systems via one of said third systems comprised in said list of third systems.

30. In a first telecommunications switching system, apparatus for determining a route through a telecommunications network comprising:

control means, comprising storage for a plurality of tables and a program, responsive to data stored in said plurality of tables, and operable under the control of said program for:

responsive to an incoming call to said first system and to data stored in a translation table of said control means, determining that said call should be routed to a second switching system;

assembling first present availability data of first communication paths between said first system and ones of third switching systems connected to said first system by said first communication paths;

receiving second present availability data of communication paths and ones of said third systems;

determining a route between said first and said second systems via one of said third systems based on said first and said second availability data; and transmitting said first availability data to ones of said second and third systems for permitting each of said ones to determine a route between said each system and said first system.

31. The apparatus of claim 30 wherein said control means is further operable under program control for testing whether a direct communication path between the first and the second system is available; and if said testing indicates that no direct communication path is available, performing the determining a route via one of said third systems operation; and if said testing step indicates that a direct communication path is available, determining that the call is to be routed over the direct communication path.

32. The apparatus of claim 30 wherein said control means is further operable under program control for periodically preparing a data message comprising said first availability data for transmission to ones of said second and third systems.

33. The apparatus of claim 30 wherein said control means is further operable under program control for preparing a data message for transmission to said second system for requesting said second availability data.

34. The apparatus of claim 33 wherein said determining is made responsive to availability data received in response to a previous request from said first system.

35. In a telecommunication network comprising a first and a second switching system and a plurality of third switching systems, a method of determining a route for a call between the first and second systems comprising the steps of:

assembling first availability data of communication paths between said first system and ones of said third systems;

assembling second availability data of communication paths between said second system and ones of said third systems;

transmitting said second availability data from said second system to said first system; and determining a route between said first and said second systems via one of said third systems based on said first and said second availability data;

wherein said availability data specifies which of a plurality of bands, ranging from lightly loaded to heavily loaded to blocked, pertain to the availability of communcation paths between a third system and said first or said second system, and wherein said step of determining comprises determining a route via a third system having communication path groups to said first and said second systems, the more heavily loaded of said groups to said first and said second systems having the least heavily loaded band of communication path availability.

36. In a first telecommunications switching system, a method of determining a route between said first telecommunications switching system and a second telecommunications switching system over a telecommunications network comprising a plurality of third telecommunications switching systems, comprising the steps of:

assembling first availability data of communication paths between said first system and ones of said third systems;

receiving second availability data of communication paths between said second system and ones of said third systems; and determining a route between said first and said second systems via one of said third systems based on said first and said second availability data;

wherein said availability data specifies which of a plurality of bands, ranging from lightly loaded to heavily loaded to blocked, pertain to the availability of communication paths between a third system and said first or said second system, and wherein said step of determining comprises determining a route via a third system having communication path groups to said first and said second systems, the more heavily loaded of said groups to said first and said second systems having the least heavily loaded band of communication path availability.

37. The method of claim 35 or 36 wherein said plurality of grades comprises a reserved grade comprising communication path groups with paths available for calls, using two links, only if no other routes have available communication paths and if a high blocking rate between the first system and the second system has been encountered.

38. The method of claim 37 wherein routes between switching systems comprise routes for transmitting different services requiring different transmission requirements, said routes having communication paths capable of transmitting for a plurality of different transmission requirements, and wherein communication paths are reserved for use for a particular transmission capability when the blocking for that capability exceeds a prespecified threshold.

39. The method of claim 38 wherein said communication paths are reserved for use for said particular transmission capability if the number of completed calls between the two switches connected by these communication paths and using said particular transmission capability is less than a prespecified threshold.

40. The method of claim 35 or 36 wherein a plurality of types of service are provided over a communication path group, wherein said plurality of grades comprises a reserved grade, and wherein the reserved grade of service is assignable to a subset of said plurality of types of service.

41. The method of claim 40 wherein said subset comprises services experiencing a high blocking rate between said first and said second system.

42. The method of claim 40 wherein said subset comprises services having fewer than a minimum desired number of calls completed.

43. The method of claim 40 wherein the reserved grade is assignable to different ones of the plurality of types of service in response to blocking for the different ones exceeding a threshold individual to each different one.

44. The method of claim 40 wherein the reserved grade is assignable to different ones of the plurality of services if the number of completed calls between the two switches for ones of said plurality of services is less than a prespecified threshold.

45. The method of claim 35 or 36 wherein a threshold of each of said plurality of bands is a function of the offered call load.

46. The method of claim 35 or 36 wherein said plurality of grades comprises a reserved grade comprising communication path groups with paths available for calls using two links only if no other routes have available paths in groups not in the reserved grade load status and if there is no direct route between the first system and the second system.

47. The method of claim 35 or 36 wherein said determining step selects among 2-link routes having the least heavily loaded of the more heavily loaded band for the route, that route having a link with the least heavily loaded band among said 2-link routes.

48. The method of claim 35 or 36 wherein the number of communication paths reserved is a function of the offered call load and the blockage rate.

49. The method of claim 48 wherein the number of communication paths reserved is zero if the offered call load is less than the current call load.

50. The method of claim 48 wherein the thresholds for the load bands of communication path groups are adjusted by the number of reserved communication paths.

51. The method of claim 35 or 36 wherein said availability data comprises a plurality of bits each bit representing availability at or in excess of a particular one of said plurality of bands.

52. A method of selecting an available telecommunications circuit for a service for a call to a destination in a system providing a plurality of services, comprising the steps of:
- if the actual load for said service to said destination over a first choice circuit group is less than a predetermined objective, selecting an available circuit of said first choice circuit group; and
- if the load for said service to said destination over said first choice circuit group equals or exceeds said predetermined objective, select an available circuit of said first choice group only if the number of available circuits exceeds a dynamically varying total reserve sum.

53. A method of selecting an available telecommunications circuit for a service for a call to a destination in a system providing a plurality of services, wherein at least one of said plurality of services is a key service to be given preferential treatment, comprising the steps of:
- if the actual load for said service to said destination over a first choice circuit group is less than a predetermined objective and said service is a key service, selecting an available circuit of said first choice circuit group; and
- if the actual load for said service to said destination over a first choice circuit group is less than a predetermined objective, and said service is not a key service, selecting an available circuit of said first choice group only if the number of available circuits of said group exceeds a dynamically varying key reserve sum;
- if neither of the previous two steps causes an available circuit of said first choice group to be selected, selecting an available circuit of said first choice group only if the number of available circuits exceeds a dynamically varying total reserve sum.

54. The method of claim 53 wherein said key reserve sum is the sum of circuits reserved for said group for all key services whose actual load is less than their predetermined objective load.

55. The method of claim 52 wherein said total reserve sum is the sum of reserved circuits for all services whose actual load is less than the objective load of that service for said first choice circuit group.

56. The method of claim 55 wherein the number of circuits reserved for a service for said first choice circuit group is a function of any positive difference between the objective and the actual load for that service being carried on said first choice circuit group.

57. The method of claim 56 wherein said function of the difference is an actual value of the difference.

58. The method of claim 56 wherein said function is limited to a prespecified reserve limit.

59. The method of claim 56 wherein a selection of a circuit of a first choice circuit group when the actual load for said service is less than the load objective modifies said total reserve sum unless the difference between the objective load and actual load for said service over said first choice group is greater than a reserve limit for that service over that group.

60. The method of claim 52 further comprising the step of:
- if neither of the steps of claim 52 result in the selection of a circuit from said first choice group, then if the actual load for said service equals or exceeds said objective for said load for said first choice group and the number of available circuits of said first choice group is equal to or less than said total reserve sum, selecting a circuit from an alternate group.

61. The method of claim 60 wherein said step of selecting a circuit from an alternate group comprises the step of:
- selecting a circuit from an alternate group if the number of circuits available in said alternate group is greater than a total reserve sum for said alternate group.

62. The method of claim 61 further comprising the step of:
- if a circuit is selected from an alternate group, maintaining the present value of the total reserve sum for said alternate group.

63. The method of claim 52 wherein said first choice circuit group is connected to a switch that is not directly connected to a first and a second destination served by said first choice circuit group as a first choice group and calls for one type of service to said first and said second destination are treated as calls for a different type of service, each with its own predetermined objective.

64. The method of claim 52 wherein said first choice circuit group is connected to a switch that is directly connected to a first destination and not directly connected to a second destination, both destinations served by said first choice circuit group as a first choice group, wherein calls for one type of service to said first and said second destination are treated as calls for a different type of service, each type with its own predetermined objective.

65. The method of claim 55 wherein said first choice circuit group carries two-way traffic and wherein a separate predetermined objective is maintained for a type of service for incoming and outgoing traffic of a particular type of service.

66. In a first telecommunications switching system for serving a plurality of different service types of calls, apparatus for determining a group through a telecommunications network for a call having a given type of service, comprising:
- control means, comprising storage for a plurality of tables and a program, responsive to data stored in said plurality of tables;
- responsive to an incoming call to said first system and to data stored in a translation table of said control means, said control means operable under the control of a first portion of said program for determining that said call should be routed to a destination;
- said control means operable under the control of a second portion of said program for determining from said data a first choice circuit group for accessing said destination;
- said control means operable under the control of a third portion of said program for determining whether the actual load for said service to said destination is less than a predetermined objective, stored in said data, for said type of service and said destination;
- if said actual load is less than said objective, said control means operable under the control of a fourth portion of said program for selecting an available circuit of said first choice group, and if said actual load is equal to or greater than said objective, for selecting an available circuit of said first choice group only if the number of available circuits exceeds a dynamically varying total reserve sum.

67. The apparatus of claim 66 wherein said plurality of different service types comprises at least one key service type and wherein said control means operable under the control of said fourth portion for selecting if said actual load is less than said objective selects any available circuit of said first choice group if said type of service is a key service type and selects an available circuit of said first choice group only if the number of available circuits of said group exceeds a dynamically varying key reserve sum if said type of service is not a key service.

68. The apparatus of claim 67 wherein said key reserve sum is the sum of circuits reserved for said group of all key services whose actual load is less than their predetermined objective load.

69. The apparatus of claim 66 wherein said total reserve sum is the sum of reserve circuits for all services whose actual load is less than the objective load for that service for said first choice circuit group.

70. A method of selecting an available telecommunications circuit for a service for a call to a destination in a system providing a plurality of services, wherein at least one of said plurality of services is a key service to be given preferential treatment, comprising the steps of:
- if the actual load for said service to said destination over a first choice circuit group is less than a predetermined objective and said service is a key service, selecting an available circuit of said first choice circuit group; and
- if the actual load for said service to said destination over a first choice circuit group is less than a predetermined objective, and said service is not a key service, selecting an available circuit of said first choice group only if the number of available circuits of said group exceeds a dynamically varying key reserve sum;
- if neither of the previous two steps causes an available circuit of said first choice group to be selected, selecting an available circuit of said first choice group only if the number of available circuits exceeds a dynamically varying total reserve sum;
- wherein said key reserve sum is the sum of circuits reserved for said group for all key services whose actual load is less than their predetermined objective load;
- wherein said total reserve sum is the sum of reserved circuits for all services whose actual load is less than the objective load of that service for said first choice circuit group, and wherein the number of circuits reserved for a service for said first choice circuit group is the difference between the objective and the actual load for that service, limited to a prespecified reserve limit;
- further comprising selecting a circuit from an alternate group if the actual load for said service equals or exceeds said objective for said load for said first choice group and the number of available circuits of said first choice group is equal to or less than said total reserve sum and the number of circuits available in said alternate group is greater than a total reserve sum for said alternate group;
- wherein if said first choice circuit group is connected to a switch that does not serve a specific destination, calls for one type of service to said specific destination are treated as calls for a different type of service, having its own predetermined objective, than calls for said one type of service to other destinations.

* * * * *

UNITED STATES PATENT AND TRADEMARK OFFICE
CERTIFICATE OF CORRECTION

PATENT NO. : 5,101,451

DATED : March 31, 1992

INVENTOR(S) : Gerald R. Ash, Jin-Shi Chen, Alan E. Frey, Andrew W. Peck

It is certified that error appears in the above-identified patent and that said Letters Patent is hereby corrected as shown below:

Column 36, claim 18, line 17, delete "lighly" and substitute --lightly--.

Column 37, claim 22, line 43, delete "reserves" and substitute --reserved--.

Column 43, claim 68, line 45, delete "of" and substitute --for--.

Signed and Sealed this

Twenty-first Day of December, 1993

Attest:

BRUCE LEHMAN

*Attesting Officer*  *Commissioner of Patents and Trademarks*